United States Patent
Popat et al.

(10) Patent No.: US 7,056,376 B2
(45) Date of Patent: Jun. 6, 2006

(54) PRINTING PROCESS USING SPECIFIED AZO COMPOUNDS

(75) Inventors: Ajay Haridas Popat, Manchester (GB); Alan Dickinson, Grangemouth (GB); Maria Soteri Hadjisoteriou, Manchester (GB); Neil James Thompson, Manchester (GB); Paul Wight, Manchester (GB); Peter Gregory, Bolton (GB); Roy Bradbury, Manchester (GB); Philip John Double, Manchester (GB); Thomas Paul, Manchester (GB)

(73) Assignee: Avecia Limited, Manchester (GB)

( * ) Notice: Subject to any disclaimer, the term of this patent is extended or adjusted under 35 U.S.C. 154(b) by 89 days.

(21) Appl. No.: 10/411,327

(22) Filed: Apr. 11, 2003

(65) Prior Publication Data

US 2004/0020404 A1 Feb. 5, 2004

(30) Foreign Application Priority Data

Jun. 13, 2002 (GB) .................................... 0213573
Jun. 13, 2002 (GB) .................................... 0213578
Aug. 7, 2002 (GB) .................................... 0218292
Oct. 2, 2002 (GB) .................................... 0222740

(51) Int. Cl.
*C09D 11/00* (2006.01)
*C09B 35/378* (2006.01)

(52) U.S. Cl. .............................. 106/31.52; 106/31.81; 106/31.48; 106/31.5; 106/31.77; 106/31.79; 534/815

(58) Field of Classification Search ............... 106/31.5, 106/31.52, 31.78, 31.81, 31.48, 31.77, 31.79; 534/814, 716
See application file for complete search history.

(56) References Cited

U.S. PATENT DOCUMENTS

| | | | | |
|---|---|---|---|---|
| 1,209,154 A | | 12/1916 | Haugwitz .................... 534/678 |
| 1,235,253 A | * | 9/1917 | Stebbins, Jr. ............... 534/813 |
| 4,426,226 A | | 1/1984 | Ohta et al. ................. 106/31.52 |
| 5,536,819 A | * | 7/1996 | Tamura et al. ........... 106/31.52 |
| 6,075,131 A | * | 6/2000 | Tallant et al. .............. 534/659 |
| 6,451,989 B1 | * | 9/2002 | Beach et al. ................. 534/728 |
| 6,503,308 B1 | * | 1/2003 | Stramel et al. .......... 106/31.27 |
| 6,749,674 B1 | * | 6/2004 | Geisenberger et al. ... 106/31.52 |
| 6,858,069 B1 | * | 2/2005 | Aoyama et al. ......... 106/31.52 |
| 2004/0040466 A1 | * | 3/2004 | Aoyama et al. ......... 106/31.52 |
| 2005/0076806 A1 | * | 4/2005 | Hanmura et al. ........ 106/31.48 |
| 2005/0126435 A1 | * | 6/2005 | Hanmura et al. ........ 106/31.46 |

FOREIGN PATENT DOCUMENTS

| | | |
|---|---|---|
| EP | 0 347 803 A2 | 12/1989 |
| EP | 0 539 178 A2 | 4/1993 |
| EP | 0 979 847 A1 | 2/2000 |
| GB | 774612 | 5/1957 |
| JP | 59-075965 | 4/1984 |

* cited by examiner

*Primary Examiner*—Helene Klemanski
(74) *Attorney, Agent, or Firm*—Morgan, Lewis & Bockius, LLP

(57) ABSTRACT

A process for printing an image on a substrate comprising applying thereto a composition comprising a liquid medium and a compound of Formula (1):

T-Q-N=N-L-T     Formula (1)

wherein:
 each T independently is an azo group;
 Q is an optionally substituted, optionally metallised 1,8-dihydroxynaphthyl group; and
 L is a divalent organic linker group.
Also claimed are compositions and dyes.

24 Claims, No Drawings

PRINTING PROCESS USING SPECIFIED AZO COMPOUNDS

This invention relates to a printing process, to compounds and processes for their manufacture, to compositions derived therefrom, to cartridges, to printed substrates and to ink sets. Ink jet printing ("IJP"), is a non-impact printing technique in which droplets of ink are ejected through a fine nozzle onto a substrate without bringing the nozzle into contact with the substrate.

There are many demanding performance requirements for dyes and inks used in IJP. For example they desirably provide sharp, non-feathered images having good water-fastness, light-fastness and optical density. The inks are often required to dry quickly when applied to a substrate to prevent smudging, but they should not form a crust over the tip of ink jet nozzles because this will stop the printer from working. The inks should also be stable to storage over time without decomposing or forming a precipitate which could block the fine nozzles.

Direct Black 38 and Direct Black 19 are known colorants for ink jet printing. These dyes comprise a 1-amino-8-hydroxynaphthalene unit.

GB 774,612 describes certain blue to bluish red dyes comprising a 1,8-dihydroxynaphthalene group carrying a tris-azo group on one side only. These dyes are used for the conventional dyeing of leather.

U.S. Pat. No. 1,209,154 describes violet dyes for cotton containing a 1,8-dihydroxynaphthalene group carrying a tris-azo group on one side only.

Surprisingly it has been found that certain compounds comprising twice-coupled 1,8-dihydroxynaphthalene have outstanding properties as ink jet inks.

According to the present invention there is provided a process for printing an image on a substrate comprising applying thereto a composition comprising a liquid medium and a compound of Formula (1):

T-Q-N=N-L-T      Formula (1)

wherein:

each T independently is an azo group;
Q is an optionally substituted, optionally metallised 1,8-dihydroxynaphthyl group; and
L is a divalent organic linker group.

Preferably the composition is applied to the substrate by means of an ink jet printer. The ink let printer preferably applies the composition to the substrate in the form of droplets which are ejected through a small orifice onto the substrate. Preferred ink jet printers are piezoelectric ink jet printers and thermal ink jet printers. In thermal ink jet printers, programmed pulses of heat are applied to the composition in a reservoir by means of a resistor adjacent to the orifice, thereby causing the composition to be ejected in the form of small droplets directed towards the substrate during relative movement between the substrate and the orifice. In piezoelectric ink jet printers the oscillation of a small crystal causes ejection of the composition from the orifice.

The substrate is preferably paper, plastic, a textile, metal or glass, more preferably a treated substrate such as a coated paper or coated plastic, especially coated paper.

Preferred plain or treated papers are papers which may have an acid, alkaline or neutral character. Examples of commercially available treated papers include HP Premium Coated Paper™, HP Photopaper™, HP Printing Paper, HP new and improved Premium Plus photopaper all available from Hewlett Packard Inc.); Stylus Pro 720 dpi Coated Paper™, Epson Photo Quality Glossy Film™, Epson Photo Quality Glossy Paper™, Epson Premium Photo Paper™ (all available from Seiko Epson Corp.); Canon HR 101 High Resolution Paper™, Canon GP 201 Glossy Paper™, Canon HG 101 and HG201 High Gloss Film™, Canon PR 101™ (all available from Canon); Kodak Premium Photopaper™, Kodak Premium InkJetpaper™ (available from Kodak); Konica Inkjet Paper QP™ Professional Photo Glossy, Konica Inkjet Paper QP™ Professional Photo 2-sided Glossy, Konica Inkjet Paper QP™ Premium Photo Glossy, Konica Inkjet Paper QP™ Premium Photo Silky™ (available from Konica); Ilford Instant Dry Paper™ (available from Ilford).

Preferably the compound of Formula (1) carries at least 2 water-solubilising groups, e.g. sulpho groups, more preferably 2 to 10 sulpho groups, especially 2 to 6 sulpho groups. In various embodiments the compound of Formula (1) carries 2, 3, 4, 5, 6, 7, 8, 9 or 10 sulpho groups.

Preferred azo groups represented by T comprise an azo link of formula —N=N— connected to a group comprising a double bond, preferably a carbon-carbon double bond. More preferred azo groups represented by T are of the formula A-N=N— wherein each A independently is an optionally substituted aryl, heteroaryl, non-aromatic heterocyclic or an alkenyl group.

Preferred optionally substituted aryl groups represented by A are optionally substituted phenyl and naphthyl. Preferred optionally substituted heteroaryl groups and non-aromatic heterocyclic groups represented by A are any heterocycle or substituted heterocycle comprising a 5 to 7 membered ring, preferably comprising at least one double bond.

Preferred optionally substituted alkenyl groups are of the Formula (2):

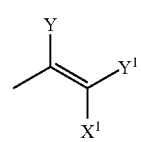

Formula (2)

wherein:

Y is an electron withdrawing group;
$Y^1$ is H, alkyl or aryl, OR or $N(R)_2$ in which each R independently is H, optionally substituted alkyl or optionally substituted aryl; or,
Y and $Y^1$ together with the double bond shown above form a 5- or 6-membered ring; and
$X^1$ comprises at least one heteroatom selected from N, O and S.

Y is preferably selected from CN, $CO_2H$, $CO_2R$, $CON(R)_2$, COR and —$SO_2N(R)_2$ in which each R is independently defined as above. When R is optionally substituted alkyl it is preferably $C_{1-8}$-alkyl, more preferably $C_{1-4}$-alkyl. When R is optionally substituted aryl it is preferably phenyl or naphthyl, more preferably phenyl. When R is optionally substituted alkyl or aryl optional substituents are preferably selected from water solubilising groups, particularly $SO_3H$, $SO_2N(R)_2$, $CO_2H$ or $PO_3H_2$.

When $Y^1$ is alkyl it is preferably $C_{1-8}$-alkyl, more preferably $C_{1-4}$-alkyl. When $Y^1$ is aryl it is preferably phenyl. When Y and $Y^1$ are joined together to form a 5- or 6-membered ring it is preferably an optionally substituted pyrazolone or triazole ring, more preferably pyrazolone or 1,3,4-triazole.

$X^1$ is preferably O, $CO_2R$ or NR in which R is defined above.

More preferably Y is $CO_2R^1$, $Y^1$ is $OR^1$ and $X^1$ is $OR^1$ wherein each $R^1$ independently is H or $C_{1-4}$-alkyl.

Optional substituents which may be present on A and L (including $L^1$ and $L^2$) are preferably selected from OH, $SO_3H$, $PO_3H_2$, $CO_2H$, $NO_2$, $NH_2$, optionally substituted alkyl (especially $C_{1-4}$-alkyl optionally carrying a sulpho, carboxy, phosphato $C_{1-4}$-alkoxy, amino or hydroxy group), optionally substituted alkoxy (especially $C_{1-4}$-alkoxy optionally carrying a sulpho, carboxy, phosphate, $C_{1-4}$-alkoxy, $C_{1-4}$-alkyl, amino or hydroxy group), optionally substituted amine (especially N carrying one or two $C_{1-4}$-alkyl groups optionally carrying a sulpho, carboxy, phosphate, $C_{1-4}$-alkoxy, amino or hydroxy group), optionally substituted acylamine (especially $C_{1-4}$-acylamino) and optionally substituted azo (especially phenylazo, naphthylazo and heteroarylazo where the phenyl, naphthyl and heteroaryl units are optionally further substituted with one or more groups selected from OH, $SO_3H$, $PO_3H_2$, $CO_2H$, $NO_2$ and $NH_2$, and azo groups comprising Formula (2) as hereinbefore defined).

Preferably each A and L independently carries from 0 to 3 substituents, more preferably 1 or 2 substituents.

Preferably at least one group represented by A carries at least one sulpho group. In a further preferred embodiment, both groups represented by A carry at least one sulpho group. In another preferred embodiment, at least one group represented by A carries at least one optionally substituted amino or acylamino group.

As examples of optionally substituted phenyl and naphthyl groups represented by A there may be mentioned 2-sulfo-4-aminophenyl, 2-sulfo-4-nitrophenyl, 2-hydroxy-4-aminophenyl and 1-hydroxy-3-sulpho-6-aminonaphthyl. Preferred optionally substituted heteroaryl groups represented by A are any heterocycle or substituted heterocycle comprising a 5 to 7 membered ring, more preferably optionally substituted pyridyl, pyrazolyl or 1,2,4-triazole.

Q is preferably optionally substituted 1,8-dihydroxynaphthylene, i.e. unmetallised.

Preferably Q is of Formula (3) or a metal complex thereof;

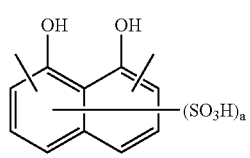

Formula (3)

wherein a is 1 or 2 and $SO_3H$ is in free acid or salt form. Preferably a is 2 and the $SO_3H$ groups shown in Formula (3) are in the 3- and 6-positions or the 3- and 5-positions.

In a preferred aspect of the invention, Q is of Formula (4) or a metal complex thereof:

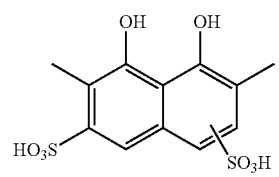

Formula (4)

More preferably Q is of Formula (5) or (6) or a metal complex thereof;

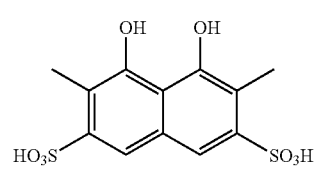

Formula (5)

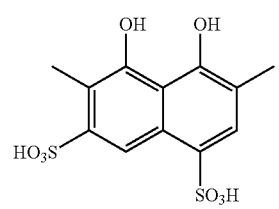

Formula (6)

In this specification any groups shown in the free acid form are also include the salt form; for example in Formulae (3), (4), (5) and (6) the $SO_3H$ groups include the free acid and salt forms. Furthermore the formulae shown in this specification cover all tautomers thereof.

Preferably L is or comprises one or more arylene groups, more preferably one or two optionally substituted phenylene or naphthylene groups. When L is or comprises more than one arylene group, the said arylene groups are optionally connected by means of a covalent bond or group containing from 1 to 10 atoms selected from O, S, N, C, H and combinations thereof, for example —O—, —$NR^2$—, —N=N—, —$NR^2$—CO—, —$NR^2CONR^2$—, —S—, —SO—, —$SO_2$—, —$SO_2NR^2$— or —$CR^2$=$CR^2$—, wherein each $R^2$ independently is H or $C_{1-4}$-alkyl.

Particularly preferred groups represented by L are of Formula (7):

$$-L^1(-G-L^2)_x-$$ Formula (7)

wherein:
 $L^1$ is a single covalent bond or optionally substituted phenyl or naphthyl;
 $L^2$ is optionally substituted phenyl or naphthyl;
 G is —O—, —$NR^2$—, —N=N—, —$NR^2$—CO—, —$NR^2CONR^2$—, —S—, —SO—, —$SO_2$—, —$SO_2NR^2$— or —$CR^2$=$CR^2$—, wherein each $R^2$ independently is H or $C_{1-4}$-alkyl; and X is 0, 1 or 2.

In one embodiment of the invention, L carries at least one substituent of the formula —O—(CH$_2$)$_{1-4}$—OH.

In a further one embodiment of the invention L is free from substituents of the formula —O—(CH$_2$)$_{1-4}$—OH.

In a yet further one embodiment of the invention L carries at least one sulpho group.

In a yet further one embodiment of the invention L is free from sulpho groups.

As examples of optionally substituted phenylene and naphthylene groups represented by L there may be mentioned 2-sulphophenylene and 2,5-di(2-hydroxyethyloxy) phenylene.

When Q is a metallised 1,8-dihydroxynaphthylene group (i.e. a metal complex) the metal is preferably B or a transition metal, more preferably Mn, Fe, Cr, Co, Ni, Cu or Zn, especially Co, Ni or Cu. The metal may be complexed with the compound of Formula (1) in a ratio of from 1:2 to 2:1, preferably in a ratio of metal to compound of Formula (1) of 1:2, 2:3, 1:1, 2:2 or 2:1, especially 2.1. However we have found that when Q is not metallised the compound of Formula (1) is still a valuable colorant for ink jet printing. Such unmetallised dyes are cheaper and easier to make than the corresponding metallised dyes and they are more environmentally friendly due to the absence of, for example, transition metals.

In view of the foregoing preferences the compound of Formula (1) is preferably as follows:

T is A-N=N— each A independently is optionally substituted phenyl, naphthyl, pyridyl or pyrazolyl;

Q is of Formula (5) or (6) or a metal complex thereof:

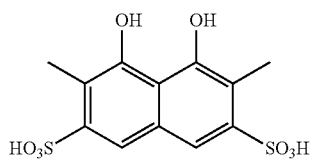

Formula (5)

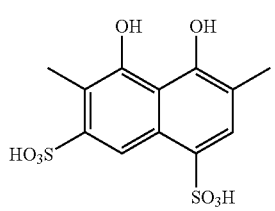

Formula (6)

L is of Formula (7):

-L$^1$(-G-L$^2$)$_x$-     Formula (7)

wherein:
L$^1$ is a single covalent bond or optionally substituted phenyl or naphthyl;
L$^2$ is optionally substituted phenyl or naphthyl;
G is —O—, —NR$^2$—, —N=N—, —NR$^2$—CO—, —NR$^2$CONR$^2$—, —S—, —SO—, —SO$_2$—, —SO$_2$NR$^2$— or —CR$^2$=CR$^2$—, wherein each R$^2$ independently is H or C$_{1-4}$-alkyl; and
X is 0, 1 or 2;

with the proviso that at least one of the groups represented by T comprises a water solubilising group selected from sulpho, phosphato and carboxy.

In one preferred embodiment of the invention, the compound of Formula (1) is of Formula (8) or a salt thereof:

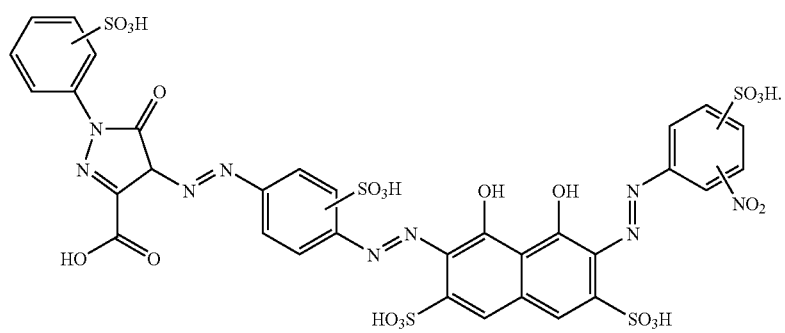

Formula (8)

In a further preferred embodiment of the invention, the compound of Formula (1) is of Formula (9) or a salt thereof:

Formula (9)

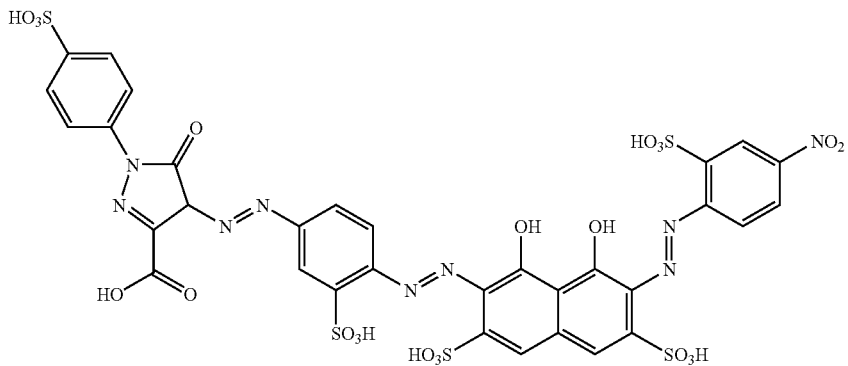

Preferably the compound of Formula (1) is black.

The composition used in the process preferably comprises:
(a) from 0.01 to 30 parts of a compound of Formula (1) or salt thereof; and
(b) from 70 to 99.99 parts of a liquid medium or a low melting point solid medium;

wherein all parts are by weight and the number of parts of (a)+(b)=100.

The aforementioned composition, and indeed compositions in general comprising a liquid medium and a compound of Formula (1), form a second aspect of the invention.

The number of parts of component (a) is preferably from 0.1 to 20, more preferably from 0.5 to 15, further preferably from 1 to 10 and especially from 1 to 5 parts. The number of parts of component (b) is preferably from 99.9 to 80, more preferably from 99.5 to 85, further preferably from 99 to 90 and especially from 99 to 95 parts.

When the medium is a liquid, preferably component (a) is completely dissolved in component (b). Preferably component (a) has a solubility in component (b) at 20° C. of at least 10%. This allows the preparation of liquid dye concentrates which may be used to prepare inks and reduces the chance of the dye precipitating if evaporation of the liquid medium occurs during storage.

Preferred liquid media include water or a mixture of water and an organic solvent.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isoprapanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2ethoxyethoxy)ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic, esters, preferably caprolactone; sulphoxides, preferably dimethyl sulphoxide and sulpholane. Preferably the liquid medium comprises water and 2 or more, especially from 2 to 8, water-soluble organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono $C_{1-4}$-alkyl ethers of diols having 2 to 12 carbon atoms, especially ((2-methoxy-2)-ethoxy)-2-ethoxyethanol.

In one embodiment, the liquid medium comprises an oxidant. This is particularly preferred for compositions wherein the group T in the compound of Formula (1) comprises a pyrazolyl group. We have found that the presence of an oxidant in the liquid medium further improves the stability of the composition. Preferred oxidants include $KIO_3$, $KIO_4$, $K_2S_2O_8$, 1,4-benzoquinone, tetrachloro benzoquinone and mixtures thereof.

Preferred low melting solid media have a melting point in the range from 60° C. to 125° C. Suitable low melting point solids include long chain fatty acids or alcohols, preferably those with $C_{18-24}$ chains, and sulphonamides. The compound of Formula (1) may be dissolved in the low melting point solid or may be finely dispersed in it.

The pH of the composition is preferably from 4 to 11, more preferably from 7 to 10. The desired pH may be obtained by the addition of a pH-adjusting agent such as an acid, base or pH buffer. The amount of pH adjusting agent used will vary according to the desired pH of the ink and is preferably present in an amount of up to 10% by wt of the total composition, more preferably from 0.1 to 6% by wt of the total composition. Preferred pH adjusting agents are pH buffers, more preferably pH buffers which maintain a pH of 4 to 8. In one preferred embodiment, the composition comprises a pH buffer and has a pH of 4 to 8. This is particularly preferred for compositions wherein the group T in the compound of Formula (1) comprises a pyrazolyl moiety. Especially preferred are pH buffers selected from the group comprising TRIS (tris(hydroxymethyl)aminomethane), cationic primary aliphatic amines, zwitterionic amino acids (these last two categories being known to those in the art as "Good's buffers" described by N. E. Good et. al. in Biochemistry, 1966, 5(2) 467–477, herein incorporated by reference), phosphate buffers, amino-hydroxyalkylsulfonic acid zwitterions (such as those described in U.S. Pat. No. 4,169,950 herein incorporated by reference) and trishydroxymethylaminomethane derivatives. Examples of suitable pH buffers include 1,3-bis[tris(hydroxymethyl)methylamino]propane, N-tris(hydroxymethyl)methyl-2-aminoethanesulfonic acid, 2-(N-morpholino)ethanesulfonic acid, N-(2-hydroxyethyl)piperazine-N'-(2-ethanesulfonic acid), 4-(N-morpholino)butanesulfonic acid, 3-[N,N-bis(2-hydroxyethyl)-amino]-2-hydroxypropanesulfonic acid, tris (hydroxymethyl)aminomethane, N-(2-acetamido)-2-iminodiacetic acid, N-tris(hydroxymethyl)methylglycine, N-(2-hydroxy-ethyl)piperazine-N'-(2-hydroxypropanesulfonic acid, N,N-diethylanthranilic acid and $NaH_2PO_4$.

The viscosity of the composition at 25° C. is preferably less than 50 cP, more preferably less than 20 cP and especially less than 5 cP.

When the compositions according to the invention are used as ink jet printing compositions, the composition preferably has a concentration of less than 500 parts per million, more preferably less than 100 parts per million of halide ions. It is especially preferred that the composition has less than 100, more preferably less than 50 parts per million of divalent and trivalent metals, wherein parts refer to parts by weight relative to the total weight of the composition. We have found that purifying the compositions to reduce the concentration of these undesirable ions reduces nozzle blockage in ink jet printing heads, particularly in thermal ink jet printers. Similarly low levels as divalent and trivalent metals are also preferred.

The compounds of the invention may be used as the sole colorant in inks because of their attractive black shade. However, if desired, one may combine the present compounds with one or more further colorants if a slightly different shade is required for a particular end use. The further colorants are preferably dyes. When further colorants are included in the ink these are preferably selected from black, magenta, cyan and yellow colorants and combinations thereof.

Suitable further black colorants include C.I.Food Black 2, C.I.Direct Black 19, C.I.Reactive Black 31, PRO-JET™ Fast Black 2, C.I.Direct Black 195; C.I.Direct Black 168; and black dyes described in patents by Lexmark (e.g. EP 0 539,178 A2, Example 1, 2, 3, 4 and 5), Orient Chemicals (e.g. EP 0 347 803 A2, pages 5–6 dyes 3, 4, 5, 6, 7, 8, 12, 13, 14. 15 and 16)and Seiko Epson Corporation.

Suitable further magenta colorants include PRO-JET™ Fast Magenta 2.

Suitable further yellow colorants include C.I.Direct Yellow 142; C.I.Direct Yellow 132; C.I.Direct Yellow 86: C.I.Direct Yellow 85; C.I.Direct Yellow 173; and C.I.Acid Yellow 23.

Suitable further cyan colorants include phthalocyanine colorants, Direct Blue 199 and Acid Blue 99.

The composition may also contain additional components conventionally used in ink jet printing inks, for example viscosity and surface tension modifiers, corrosion inhibitors, biocides, kogation reducing additives and surfactants which may be ionic or non-ionic.

In a third aspect of the invention we have also devised a process for the preparation of a compound of Formula (1), as hereinbefore defined, which comprises diazotising an amine (preferably of formula $A-NH_2$) and coupling the resultant diazonium salt with a compound of formula T-Q-N=N-LH, wherein A, T, L and Q are each independently as hereinbefore defined to give a compound of Formula (1). The compound of formula T-Q-N=N-LH is formed by diazotising an amine of formula $L-NH_2$ to give a diazonium salt, and coupling the resultant diazonium salt with a compound of formula T-QH to give a compound of formula T-Q-N=N-LH. Preferably the diazotisations are carried out using a diazotising agent especially sodium nitrite. Further preferably the diazotisations are carried out at a temperature of 0 to 25° C., more preferably at 0 to 20° C., further preferably at 0 to 5° C.

Preferably the diazotisation is performed using a diazotising agent, especially sodium nitrite. Further preferably the diazotisation is performed at a temperature of 0 to 5° C. Surprisingly we have found that the coupling can be performed under conditions of moderate, i.e. relatively neutral, pH facilitated by the use of substantial amounts of aprotic solvents. Aprotic solvents which may be used may be chosen from, for example, dimethylformamide, dimethylsulphoxide, N-methylpyrrolidone, 2-pyrrolidone, ethers, acetone, glymes such as polyglyme (MW 300) or polyethylene glycols and/or mixtures thereof. Particularly preferred aprotic solvents are tetrahydrofuran, N-methylpyrrolidone and polyglyme. The aprotic solvent is preferably present in the range 0 to 80 wt %, preferably 20 to 60 wt %, especially 25 to 45 wt % relative to the total solvent amount used. Use of substantial amounts of aprotic solvents has the advantage of permitting diazo coupling at much lower pH than customary (usually pH in the region of 14), thereby significantly improving the efficiency, from 30% to as much as 70%, of the process as a result of greatly reduced decomposition of diazonium salts.

Preferably the process of the third aspect of the present invention is performed in the presence of an acid binding agent to maintain a moderate pH. Preferably the acid binding agent used is any which maintains the pH between 5 and 9, preferably between 6 and 7.5. Further, the acid binding agent is preferably selected from but is not limited to alkali metal hydroxides, carbonates, bicarbonates or phosphates or organic bases such as triethanolamine or triethylamine. Particularly preferred alkali metal hydroxide-acid-binding agents are NaOH, KOH and LiOH, especially NaOH and LiOH. Particularly preferred alkali metal carbonate acid-binding agents are $Li_2CO_3$ and $Na_2CO_3$, especially $Na_2CO_3$. This has the advantage of maintaining pH sufficiently low to reduce the decomposition of diazonium salts significantly.

A fourth feature of the present invention comprises a process for the preparation of a compound of Formula (1), as hereinbefore defined, which comprises the reaction of a compound of formula T-X—N=N-L-T (wherein each T independently and L are as hereinbefore defined and X is an optionally substituted 1-hydroxy-8-amino-naphthylene group) with a strong base thereby forming a compound of Formula (1) optionally followed by contacting the compound so formed with a metal salt. Preferably the strong base is a metal hydroxide, more preferably an alkali metal hydroxides especially sodium or potassium hydroxide. The reaction with strong base preferably comprises heating in solution at an elevated temperature until reaction is complete. Preferred elevated temperatures are 60 to 90° C. more preferably 65 to 80° C., especially 65 to 75° C. The pH is preferably alkaline, more preferably 10 to 14, especially 12 to 14.

The compound of formula T-X—N=N-L-T may be formed by diazotising an amino of formula T (preferably A-NH$_2$) and coupling the resultant diazonium salt with a compound of formula T-X—N=N-LH.

The process according to the fourth aspect of the present invention has the unexpected advantages of using common and cheaply available starting materials based on 1-amino-8-hydroxynaphthylene disulphonic acid. In a further optional step, the process optionally further comprises the complexation of a compound of Formula (1) with a metal, preferably a transition metal.

A fifth aspect of the invention provides a compound of Formula (1) and salts thereof, as hereinbefore defined, with the proviso that at least one of the groups represented by T comprises a water-solubilising group, preferably selected from sulpho, phosphato and carboxy (for the avoidance of doubt sulpho does not include sulphato). Preferred compounds of Formula (1) are as defined above in relation to the process of the first aspect of the present invention and the composition according to the second aspect of the present invention.

A further aspect of the present invention provides a paper, an overhead projector slide or a textile material printed with a composition, a compound or by means of a process according to the present invention.

A still further as aspect of the present invention provides an ink jet printer cartridge, optionally refillable, comprising one or more chambers and a composition, wherein the composition is present in at least one of the chambers and the composition is as defined in the second aspect of the present invention.

In a yet further aspect of the present invention, an ink set is provided, which comprises a black ink, a magenta ink, a cyan ink and a yellow ink, wherein the black ink comprises a compound according to the fifth aspect of the present invention and/or a composition according to the second aspect of the present invention.

Dyes typically comprised in a magenta ink in such an ink set include Pro-Jet® Fast Magenta 2 and/or Acid Red 52. Dyes typically comprised in a cyan ink in such an ink set include C.I. Direct Blue 199, Direct Blue 68 and/or Direct Blue 87. Dyes typically comprised in a yellow ink in such an ink set include C.I. Direct Yellow 86, Direct Yellow 132 and/or Direct Yellow 173. Optionally the black ink further contains one or more black dyes, e.g. Pro-Jet® Fast Black 2 and/or any of the dyes described in EP 539,178 A2 or EP 347,803.

The present compounds and compositions provide prints of attractive, neutral black shades that are particularly well suited for the ink jet printing of text and images. The compositions have good storage stability and low tendency to block the very fine nozzles used in ink jet printers. Furthermore, compounds of Formula (1) may be used to provide printer images having good optical density, good fastness properties (e.g. light-fastness and wet-fastness) and resistance to fading in the presence of oxidising air pollutants (e.g. ozone).

The invention is further illustrated by the following Examples in which all parts and percentages are by weight unless specified otherwise. The abbreviation "Ac" means CH$_3$CO— and N/A means "not applicable".

EXAMPLE 1

Preparation of:

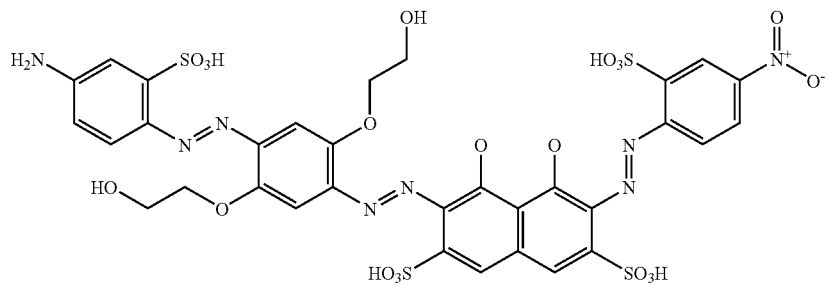

Stage (A)—First Diazotisation and Coupling

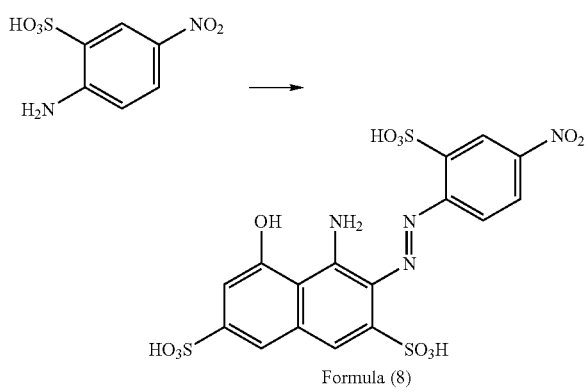

Formula (8)

Sodium nitrite (5.8 g) was added to a suspension of 5-nitro-2-aminobenzenesulfonic acid (21.3 g) in water (350 ml). The suspension was cooled to <5° C. and added over 0.5 h to a cooled (<5° C.) mixture of ice/water (100 g) and concentrated hydrochloric acid (20 ml). The mixture was stirred at <5° C. for 0.5 h and the excess nitrous acid was destroyed by addition of sulfamic acid. A solution of 1-amino-8-hydroxy-3,6-disulpho naphthalene (40 g) in water (100 ml) at pH 6.0 was added to the above solution over 0.5 h whilst maintaining pH 1.8 and <5° C. and then stirred for a further 2 h. The solution was salted to 10% w/w sodium chloride and the resulting precipitate collected by filtration. The solid washed with saturated brine (200 ml)

and dried in the oven at 50° C. overnight to give the monoazo compound Formula (8) (92 g) shown above.

Stage (B)—Second Diazotisation and Coupling

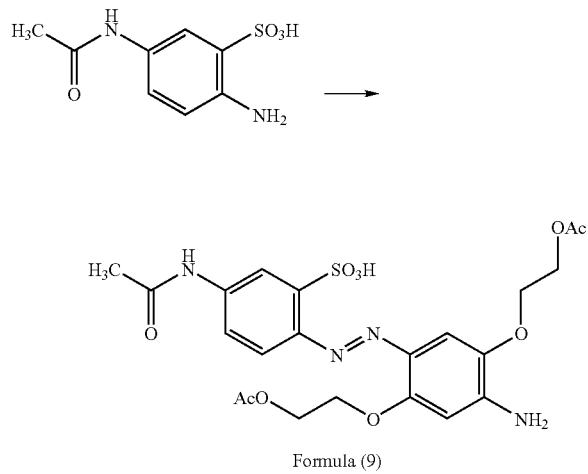

Formula (9)

Sodium nitrite (18 g) was added portionwise to a cooled (<5° C.) stirred mixture of 5-acetylamino-2-aminobenzene sulfonic acid (74 g), water (500 ml) and concentrated hydrochloric acid (75 ml). The mixture was stirred for 1 hour at <5° C. and sulfamic acid was added to destroy excess nitrous acid. This suspension was added portionwise over 0.5 hours to a stirred solution of 2,5-diacetoxyethoxy aniline (70 g) in water (350 ml) at <5° C. The mixture was stirred for 3 hours and the resulting solid was collected by filtration, slurried in acetone and then filtered. The solid was washed with acetone, dried overnight at 60° C. to give the amine Formula (9) (65 g) shown above.

Stage (C)—Third Diazotisation and Coupling

Sodium nitrite (2.7 g) was added to a suspension of the amine Formula (9) (17 g) in water (200 ml) at pH 9 (saturated sodium hydroxide solution) and acetone (100 ml). The suspension was added portionwise over 10 min to a cooled (<5° C.), stirred mixture of ice/water (100 g) and concentrated hydrochloric acid (18 g). The reaction mixture was stirred at room temperature for 1 hour and 1-methyl-2-pyrrolidinone (50 ml) was added to aid solubility. The reaction mixture was stirred for a further 1 hour and excess nitrous acid was destroyed with sulfamic acid. The suspension was added in four portions to a cooled (<5° C.), stirred solution of the monoazo compound Formula (8) (45 g) in water (200 g) at pH 7 (saturated sodium hydroxide solution). The pH of the reaction mixture dropped to ~3 after the addition of each aliquot of diazonium salt and was raised to 7 by the addition of 2N sodium hydroxide. The reaction mixture was stirred overnight, during which it warmed up to room temperature. The product was salted-out (10% w/v sodium chloride), filtered off and washed with 10% brine. The solid was dissolved in water and the pH adjusted to 12 (saturated sodium hydroxide solution). The solution was stirred overnight and the pH was lowered to 7 (concentrated hydrochloric acid). The product was precipitated by the addition of acetone, filtered off and washed with acetone. The solid was dissolved in water and the resulting solution was dialysed (<50 $\mu Scm^{-1}$), filtered (GF/A, GF/F and 0.45 $\mu$m nylon) and dried overnight at 60° C. to give the trisazo compound Formula (10) (12 g).

Stage (D) Conversion of Amino to Hydroxy Group

A solution of the trisazo compound Formula (10) (8 g) in water (80 ml) was heated at 60° C. and pH 12.5 (2N sodium hydroxide), for 8 h. The mixture was allowed to cool to room temperature and adjusted to pH 7 with concentrated hydrochloric acid. The product was precipitated by addition of acetone. The collected solid was washed with acetone, re-dissolved in water and precipitated with acetone. The solid was dissolved in the minimum amount of water and the resulting solution was dialysed (<50 $\mu Scm^{-1}$), filtered (GF/

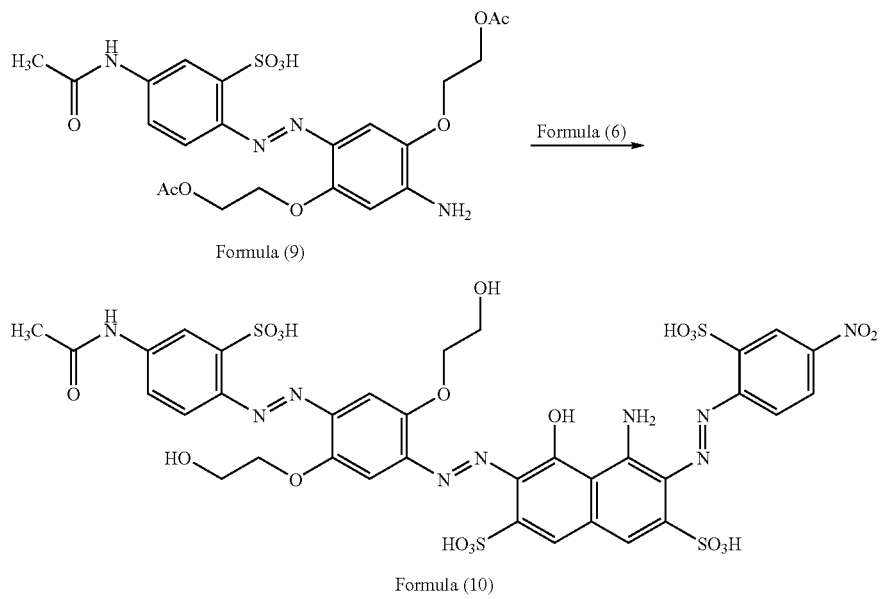

A, GF/F and 0.45 μm nylon) and dried over 3 d at 60° C. to give the title compound (1.3 g).

EXAMPLE 2

Preparation of:

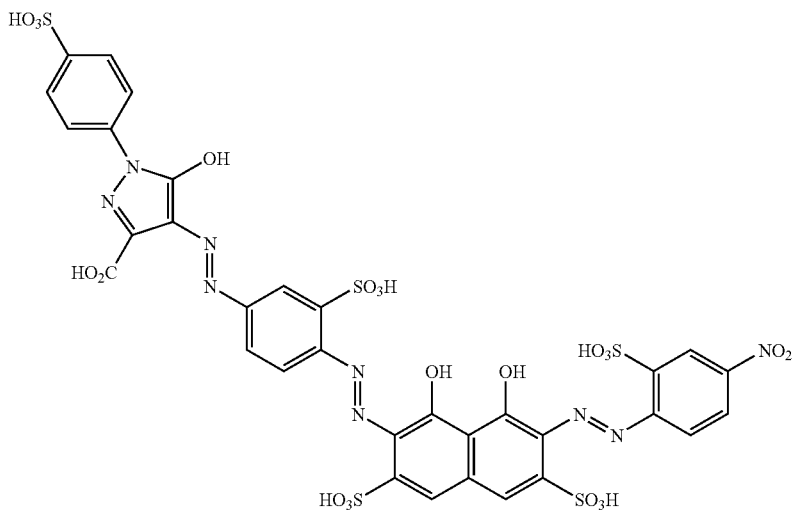

Stage (A)—First Coupling

5-Acetylamino-2-aminobenzene sulphonic acid (23.0 g, 0.10 moles) was added to water (300 ml), containing concentrated hydrochloric acid (30 g). Sodium nitrite (6.9 g) was added over 10 minutes at 0 to 5° C. After 60 minutes the excess nitrous acid was destroyed and the resultant solution of diazonium salt was added slowly at 5 to 10° C. and pH 8 to 9, to a solution of 1,8-dihydroxynaphthalene-3,6-disulphonic acid (32.0 g, 0.10 moles), which had been dissolved in water (500 g). The reaction was shown to have reacted quantitatively by HPLC.

Stage (B)—Second Coupling

5-Nitro-2-aminobenzene sulphonic acid (43.6 g, 0.20 moles) was added to water (500 g), containing concentrated hydrochloric acid (60 g). Sodium nitrite (13.8 g) was added over 15 minutes at 0 to 5° C. After 60 minutes the resultant solution of diazonium salt was added over 120 minutes at 5 to 10° C. and pH 6 to 7, to the above dye base to which previously had been added tetrahydrofuran (1000 g). After 5 hours the resultant precipitate was then collected and after oven drying gave a dark red solid (55.3 g).

The above dark red solid was dissolved in water (1000 ml) and heated to 80° C. Sodium hydroxide (10 g) was added and the temperature maintained at 80° C. for 8 hours. After this time the pH was adjusted to 7 to 8 with concentrated hydrochloric acid and the solution allowed to cool to ambient temperature. The solution was then dialysed using visking tubing (<50 μScm$^{-1}$) and then screened through a cascade of filters (GF/A, GF/D, 0.45 μm) and dried in the oven to give a 47.2 g of a black solid ($\lambda_{max}$ 584 nm).

Stage (C)—Third Coupling

The above black solid was re-dissolved in water at pH 7 to 9, lithium hydroxide being used to adjust pH. Sodium nitrite (8.3 g) was then added and allowed to stir in for 10 minutes. The dye/nitrite solution was then transferred into iced water (100 ml) containing concentrated hydrochloric acid (30 g). The temperature was allowed to rise to 15 to 25° C. and held for three hours. The resultant solution of diazonium salt was added over 120 minutes at 15 to 20° C. and pH 6 to 7, to a solution of 1-(4-sulphophenyl)-3-carboxy-5-pyrazolone (17.9 g, 0.06 moles). The pH being maintained by addition of lithium hydroxide. The solution was then dialysed using Visking™ tubing (<50 μScm$^{-1}$) and then screened through a cascade of filters (GF/A, GF/D, 0.45 μm) and dried in the oven to give the title product as a black solid (60.0 g).

EXAMPLES 3–22

The method of Example 2 was repeated except that where indicated in Table 1 the compound in column C was used in place of 1-(4-sulphophenyl)-3-carboxy-5-pyrazolone. The formula of the final dye is given in column D.

TABLE 1

| Ex: | C | D Formula of final dye | Lambda Max (nm) |
|---|---|---|---|
| 3 | | | 680 |
| 4 | | | 589 |

TABLE 1-continued

| Ex: | C | D Formula of final dye | Lambda Max (nm) |
|---|---|---|---|
| 5* | (pyrazolone with phenyl-SO3H and HO2C substituents) | (final dye structure with pyrazolone, azo linkages, naphthalene diol disulfonic acid, and aminophenyl sulfonic acid groups) | 625 |
| 6 | (barbituric acid) | (final dye structure with barbituric acid, azo linkages through sulfophenyl groups to naphthalene diol disulfonic acid and nitrophenyl sulfonic acid) | 571 |

TABLE 1-continued

| Ex: | C | D Formula of final dye | Lambda Max (nm) |
|---|---|---|---|
| 7 | 3-methyl-1-(4-sulfophenyl)-5-pyrazolone | (structure) | 570 |
| 8 | resorcinol (1,3-dihydroxybenzene) | (structure) | 583 |

TABLE 1-continued
| Ex: | C | D Formula of final dye | Lambda Max (nm) |
|---|---|---|---|
| 9 | 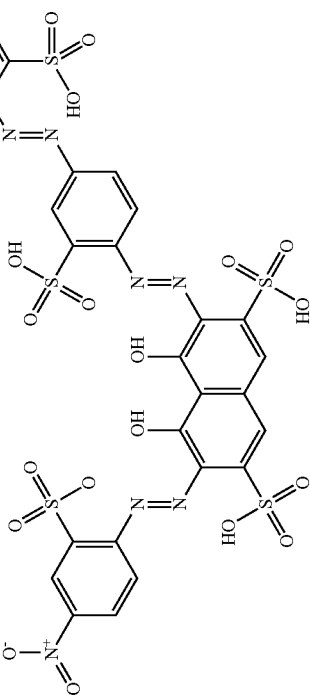 | 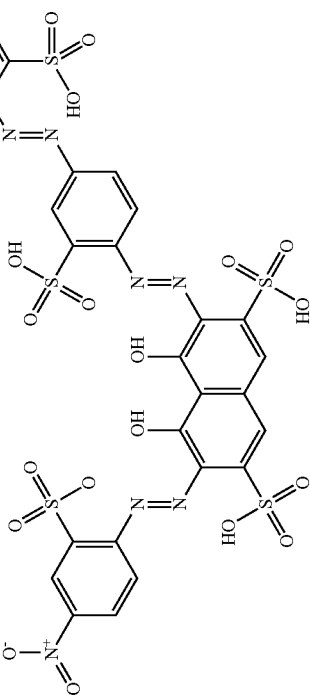 | — |

TABLE 1-continued

| Ex: | C | D Formula of final dye | Lambda Max (nm) |
|---|---|---|---|
| 10 | (structure) | (structure) | — |

TABLE 1-continued
| Ex: | C | D Formula of final dye | Lambda Max (nm) |
|---|---|---|---|
| 11 | 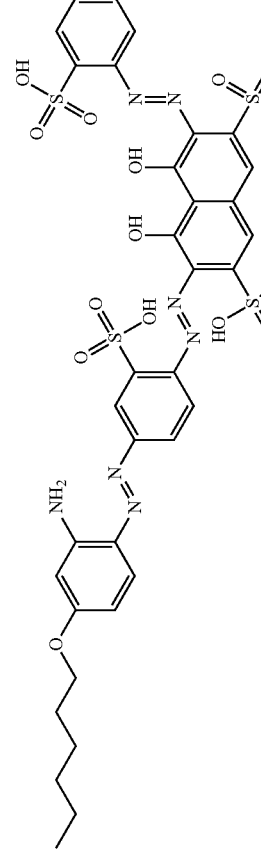 | | 594 |
| 12 | 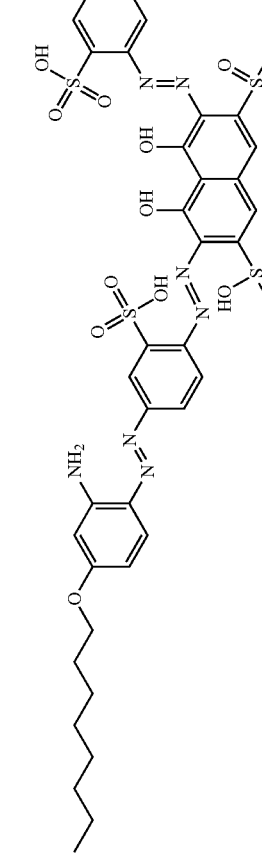 | | 596 |
| 13 | 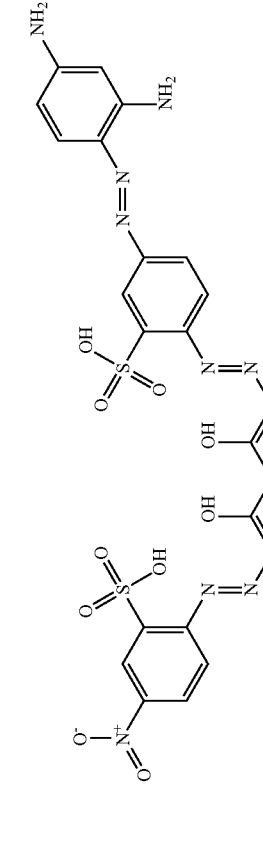 | | 607 |

TABLE 1-continued

| Ex: | C | D Formula of final dye | Lambda Max (nm) |
|---|---|---|---|
| 14 | (naphthalene-1,5-diol-3,7-disulfonic acid) | (bis-azo dye structure with nitro-sulfophenyl groups) | 627 |
| 15 | (3-hydroxy-2-naphthoic acid) | (bis-azo dye structure with nitro-sulfophenyl groups) | 601 |

TABLE 1-continued

| Ex: | C | D Formula of final dye | Lambda Max (nm) |
|---|---|---|---|
| 16 | (structure) | (structure) | 617 |
| 17 | (structure) | (structure) | 619 |

TABLE 1-continued

| Ex: | C | D Formula of final dye | Lambda Max (nm) |
|---|---|---|---|
| 18 | (structure) | (structure) | 623 |
| 19 | (structure) | (structure) | 639 |

TABLE 1-continued

| Ex: | C | D Formula of final dye | Lambda Max (nm) |
|---|---|---|---|
| 20 | (3-butoxyaniline) | (azo dye structure) | 643 |
| 21 | (3-decyloxyaniline) | (azo dye structure) | 596 |
| 22 | (3-methoxyaniline) | (azo dye structure) | 620 |

*made by reduction of the nitro compound using sodium sulphite

EXAMPLES 23–26

The method of Example 2 was repeated except that where indicated in Table 2 the compound in Column A was used in place of 1-(4-sulphophenyl)-3-carboxy-5-pyrazolone, the compound in Column B was used in place of 5-acetylamino-2-benzoic acid and the compound in Column C was used in place of 5-nitro-2-aminobenzene sulphonic acid in Stage (B). The formula of the final dye is given in column D.

TABLE 2
| Ex. No. | A | B | C | D (Formula of final Dye) | λ$_{max}$ (nm) |
|---|---|---|---|---|---|
| 23 | 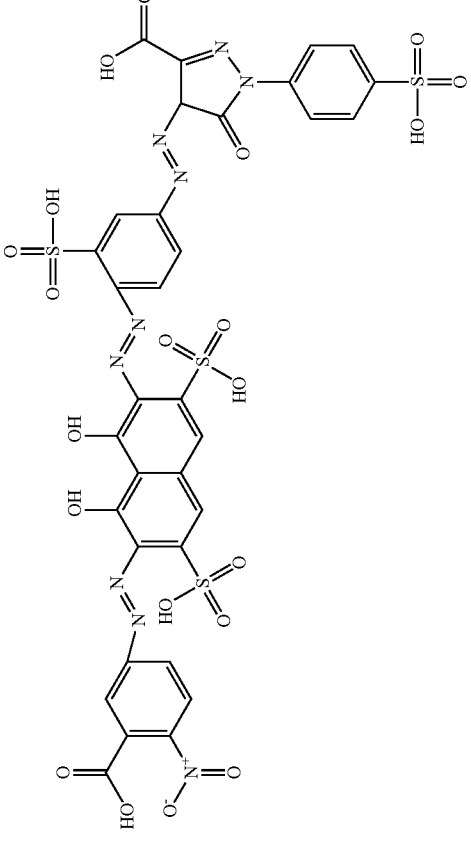 | N/A | 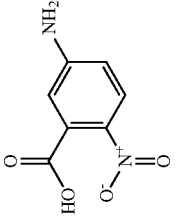 | 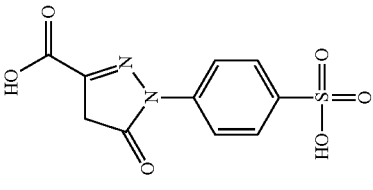 | 600 |
| 24 | 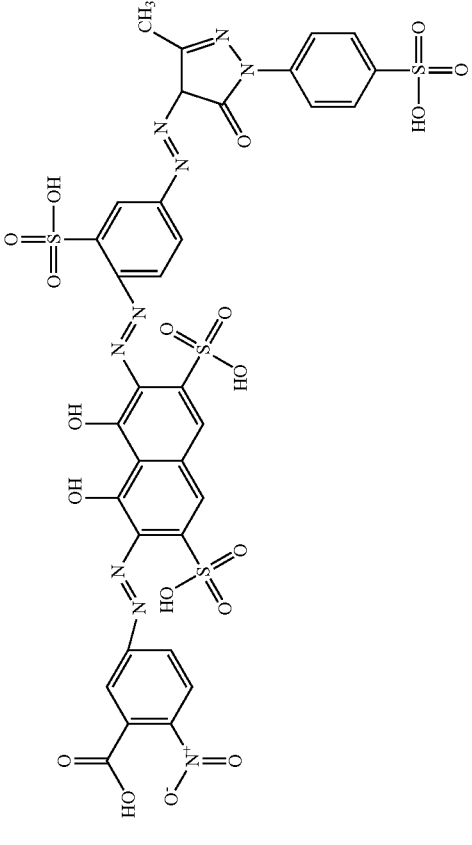 | N/A | | | 594 |

TABLE 2-continued
| Ex. No. | A | B | C | D (Formula of final Dye) | $\lambda_{max}$ (nm) |
|---|---|---|---|---|---|
| 25 | 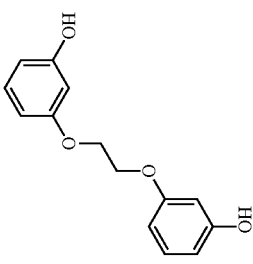 | N/A | 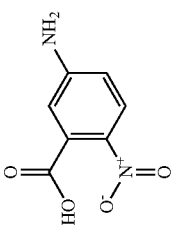 | 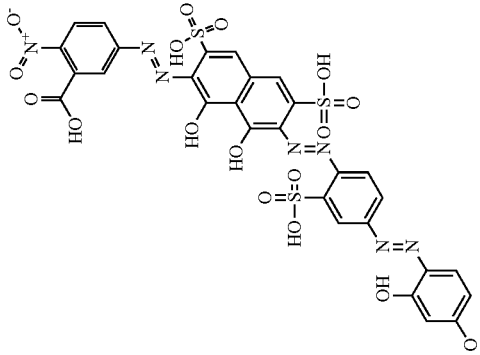 | 602 |

TABLE 2-continued
| Ex. No. | A | B | C | D (Formula of final Dye) | λmax (nm) |
|---|---|---|---|---|---|
| 26 | 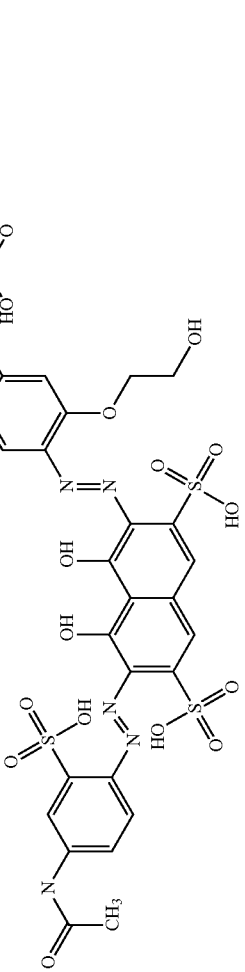 | 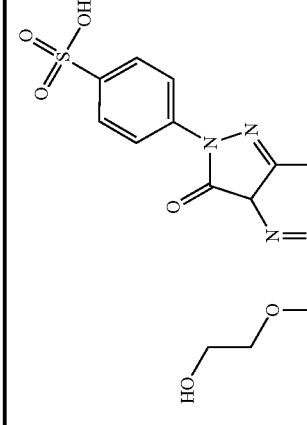 | 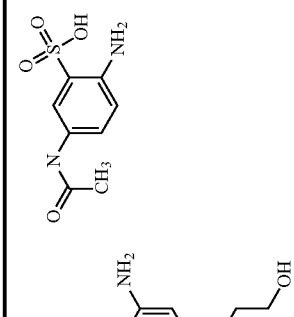 | 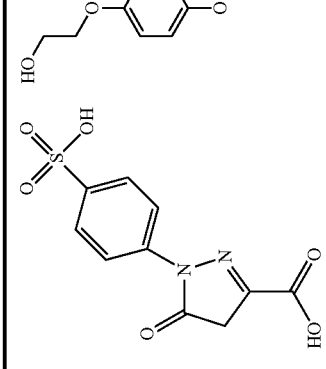 | 670 |

EXAMPLE 27
Preparation of:
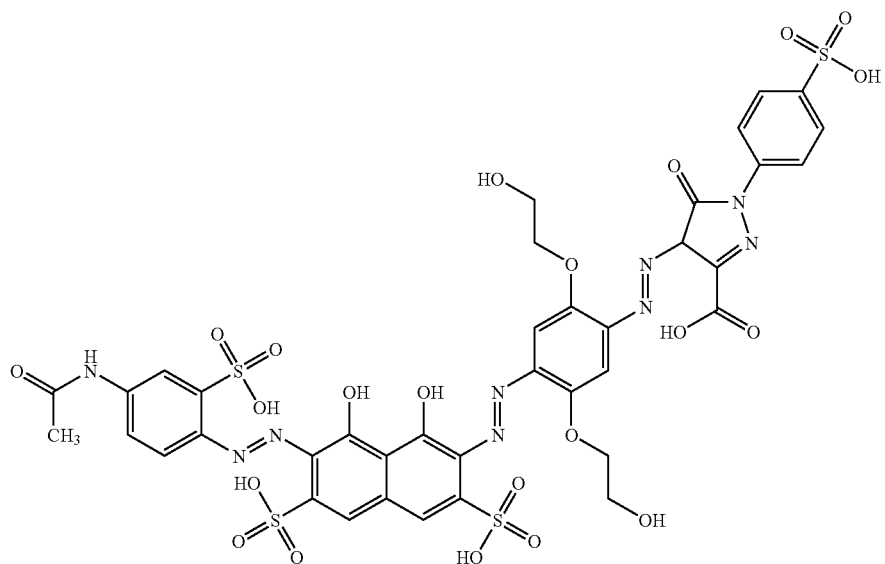
The method of Example 2 was repeated except that 2,5-diacetoxyethoxyaniline was used in place of 5-acetylamino-2-aminobenzene sulphonic acid in Stage (A).
EXAMPLE 28
Preparation of:
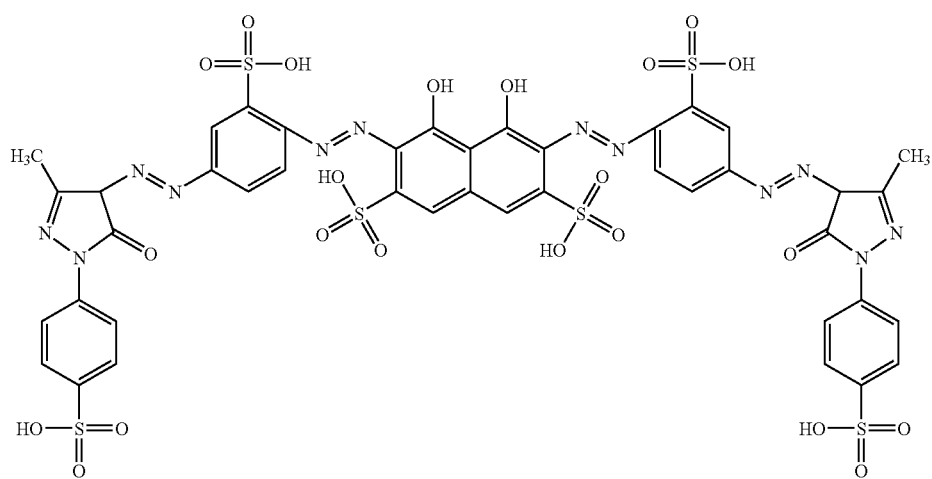

Step 1—Preparation of:

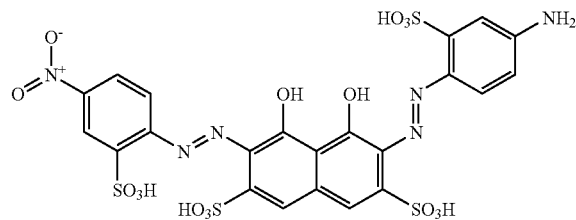

This was prepared according to the procedure given above in Example 2, Stages (A) and (B).

Step 2—Final Dye Synthesis:

A solution of sodium sulphide (2.93 g) and sodium sulphite (0.19 g) in water (30 ml) was added to a stirred solution of the product from step 1 above (20 g) in water (300 ml) at pH 8 (2N LiOH). The mixture was stirred at room temperature for 48 hours, after 1 hour the pH had risen to 12.4. The solution was screened through GF/F paper and then the pH was adjusted to 7. The product was isolated by addition of LiCl (250 g) followed by filtration and then the past was dried in the oven to give the diamine as a black solid (10.8 g).

A solution of the diamine (9 g) and sodium nitrite (0.82 g) in water (200 ml) at pH 7 (2N LiOH) and 0–5° C. was added to a stirred mixture of concentrated hydrochloric acid (15 ml) in ice/water (100 ml) at 0–5° C. and maintained at that temperature with stirring for 1 hour. Sulphamic acid was added to destroy excess nitrous acid. A solution of 1-(4-sulphophenyl)-3-methyl-5-pyrazalone (3.08 g) in water (100 ml) at pH 7 (2N LiOH) and 0–5° C. was added dropwise to the prepared diazo solution. After addition the resulting solution was adjusted to pH 7 at 0–5° C. and stirred under these conditions for 2.5 hours. The dye was isolated by addition of 10% w/v LiCl solution until precipitation was complete and then filtered and washed with 10% w/v LiCl solution. The resulting black paste was dissolved in water (300 ml) and dialysed using Visking™ tubing(<50 μScm$^{-1}$) and screened through a cascade of filters (GF/A, GF/D, 0.45 μm) and dried in the oven to give the title dye as a black solid (6 g).

EXAMPLE 29

Preparation of:

Stage (A)

A solution of monoazo compound of Formula (9) (108 g) (as prepared in Stage (B) of Example 1 above) and sodium nitrite (27.4 g) in water (1.2 l) and acetone (800 ml) at pH 10, adjusted with lithium hydroxide was added over 10 minutes to a mixture of water (200 ml) and concentrated hydrochloric acid (80 ml) at room temperature. The solution was stirred for 1 hour and then excess nitrous acid was destroyed by addition of sulfamic acid. This solution was added over 10 minutes to a solution of chromotropic acid (80 g, 0.2 mol) in water (800 ml) at pH 7–8 and 0–10° C. and the resulting solution was stirred overnight at room temperature. Lithium hydroxide (20 g) was added and the solution was stirred for 1 hour at room temperature. The solution was then adjusted to pH7 (concentrated hydrochloric acid) and then lithium chloride (250 g) was added whilst maintained at room temperature. The resulting mixture was filtered, washed with lithium chloride solution (1 l, 15%) and the collected paste was stirred in acetone (2.5 l). This mixture was filtered, washed with acetone (1 l) and dried in the oven to give a dark blue solid (150 g).

Stage (B)

A solution of sodium nitrite (15 ml, 10% w/v) was added dropwise to a solution of 5-nitro-2-aminobenzene sulfonic acid (5.8 g) in water (80 ml) and concentrated hydrochloric acid (15 ml) at 0–5° C. The solution was stirred for 30 minutes and then excess nitrous acid was destroyed by addition of sulfamic acid. This solution was added portionwise to a solution of the dark blue solid (10.1 g) from Stage (A) in water (100 ml) and THF (50 ml) at pH7 (4N LiOH solution) and 0–5° C. The resulting solution was maintained at this temperature and pH for 4 hours and then allowed to warm to room temperature overnight. Lithium chloride (15 g) was added at 30° C. and the resulting mixture was filtered and the collected paste was washed with lithium chloride solution (150 ml, 7.5%). This paste was then slurried in acetone (250 ml) with some water and the solid was collected, washed with acetone and then dried at 70° C. The resulting solid was dissolved in water (50 ml), dialysed using Visking™ tubing (<50 μScm$^{-1}$) and the resulting solution was screened through a cascade of filters (GF/A, GF/D, 0.45 μm) and dried in the oven to give the title product as a black solid (5 g).

EXAMPLES 30–62

The method of Example 29 was repeated except that where indicated in Table 3 in place of the monoazo compound of Formula (9) in Stage (A) there was used the monoazo compound obtained from the azo-coupling of the

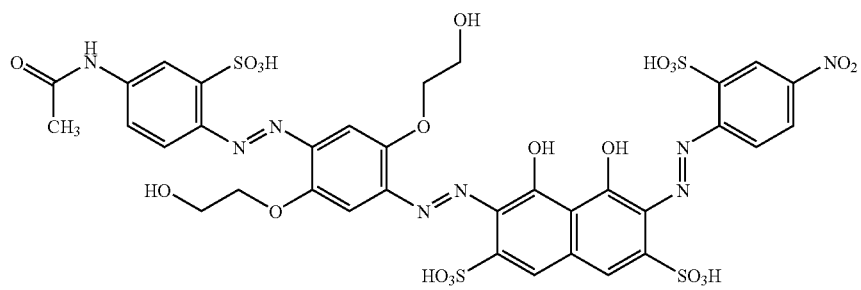

components shown in columns A and B of Table 3; and, in place of 5-nitro-2-aminobenzene sulfonic acid in Stage (B), there was used the amine shown in column C of Table 3, unless indicated "N/A". The formula of the final dye is given in Table 3, column D.

In Example 53, the Glucose Reductive Coupling was Carried Out as Follows:

Concentrated sodium hydroxide (7 ml) was added to a stirred solution of the disazo intermediate derived as indicated in the Table(16.8 g) in water (200 ml) at 75° C. followed by a solution of D-glucose (2.2 g) in water (3 ml). The solution was stirred at 75° C. for 30 mins and then cooled to room temperature before adjusting to pH 1 with concentrated hydrochloric acid. Acetone (500 ml) was added to the stirred solution and the resulting precipitate was collected by filtration, washed with acetone (300 ml) and then redissolved in water (200 ml) at pH 8 (2N LiOH). The solution was dialysed (<100 $\mu Scm^{-1}$) and screened through a cascade of filters (GF/A, GF/D, 0.45 µm) and dried in the oven to give the title dye as a black solid (12.5 g).

TABLE 3

| Ex. | A | B | C | D (Formula of final dye) | Lambda Max (nm) |
|---|---|---|---|---|---|
| 30*[h] | N/A | N/A | N/A | [structure] | 671 |
| 31 | N/A | N/A | [structure: 2-amino-benzene-1,4-disulfonic acid] | [structure] | 640 |
| 32*[h] | N/A | N/A | [structure: 2-amino-benzene-1,4-disulfonic acid] | [structure] | 653 |
| 33[#] | N/A | N/A | N/A | [structure] | 640 |

TABLE 3-continued
| Ex. | A | B | C | D (Formula of final dye) | Lambda Max (nm) |
|---|---|---|---|---|---|
| 34*‡# | N/A | N/A | N/A | 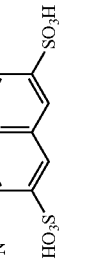 | 658 |
| 35 | 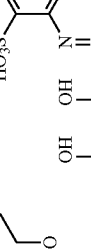 | 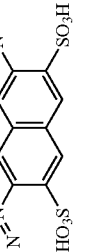 | N/A |  | — |
| 36*‡ | 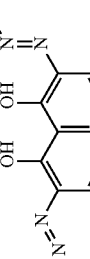 |  | N/A |  | — |

TABLE 3-continued

| Ex. | A | B | C | D (Formula of final dye) | Lambda Max (nm) |
|---|---|---|---|---|---|
| 37 | [naphthalene with SO₃H, NH₂, SO₃H, HO₃S substituents] | [benzene with OH, O-CH₂CH₂OH, NH₂, O-CH₂CH₂OH substituents] | N/A | [trisazo dye structure] | 628 |
| 38 | N/A | N/A | [2,5-dimethoxy-4-nitroaniline] | [disazo dye structure] | 628 |
| 39 | N/A | N/A | [3-amino-1,2,4-triazole-5-carboxylic acid] | [disazo dye structure] | 630 |

TABLE 3-continued

| Ex. | A | B | C | D (Formula of final dye) | Lambda Max (nm) |
|---|---|---|---|---|---|
| 40*b | N/A | N/A | (triazole-CO2H with NH2) | (dye structure) | 640 |
| 41 | N/A | N/A | (4-nitroaniline) | (dye structure) | 628 |
| 42 | N/A | N/A | (2-nitro-5-amino benzoic acid) | (dye structure) | 634 |
| 43 | N/A | (8-amino-naphthalene-2-sulfonic acid) | (2-nitro-5-amino benzoic acid) | (dye structure) | 580 |

TABLE 3-continued

| Ex. | A | B | C | D (Formula of final dye) | Lambda Max (nm) |
|---|---|---|---|---|---|
| 44 | N/A | N/A | (1,2,4-triazole-3-amino-5-carboxylic acid) | (final dye structure) | 630 |
| 45 | N/A | N/A | (4-amino-2-nitrobenzenesulfonic acid) | (final dye structure) | 624 |
| 46 | N/A | (2,5-dimethoxyaniline) | (5-amino-2-nitrobenzoic acid) | (final dye structure) | 620 |

TABLE 3-continued

| Ex. | A | B | C | D (Formula of final dye) | Lambda Max (nm) |
|---|---|---|---|---|---|
| 47 | N/A | 2,5-diethoxyaniline | N/A | [structure] | 646 |
| 48(*1) | N/A | N/A | N/A | [structure] | 706 |

TABLE 3-continued

| Ex. | A | B | C | D (Formula of final dye) | Lambda Max (nm) |
|---|---|---|---|---|---|
| 49(*2) | [structure] | [structure] | N/A | [structure] | — |
| 50(*2) | [structure] | [structure] | N/A | [structure] | — |
| 51 | N/A | N/A | [structure] | [structure] | 658 |

TABLE 3-continued
| Ex. | A | B | C | D (Formula of final dye) | Lambda Max (nm) |
|---|---|---|---|---|---|
| 52 | N/A | 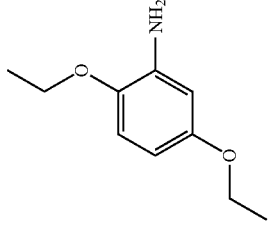 | 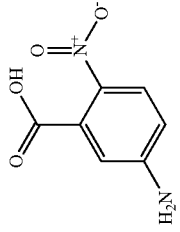 | 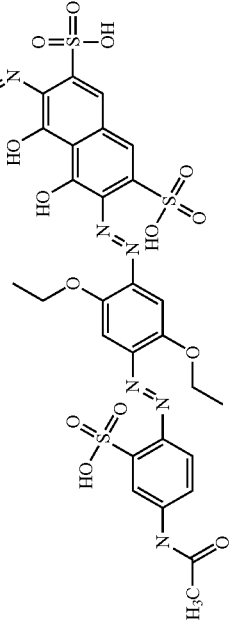 | 638 |

TABLE 3-continued
| Ex. | A | B | C | D (Formula of final dye) | Lambda Max (nm) |
|---|---|---|---|---|---|
| 53 | None*g | 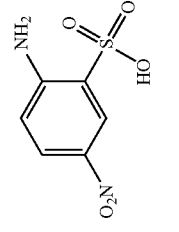 | 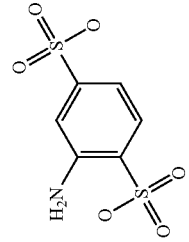 | 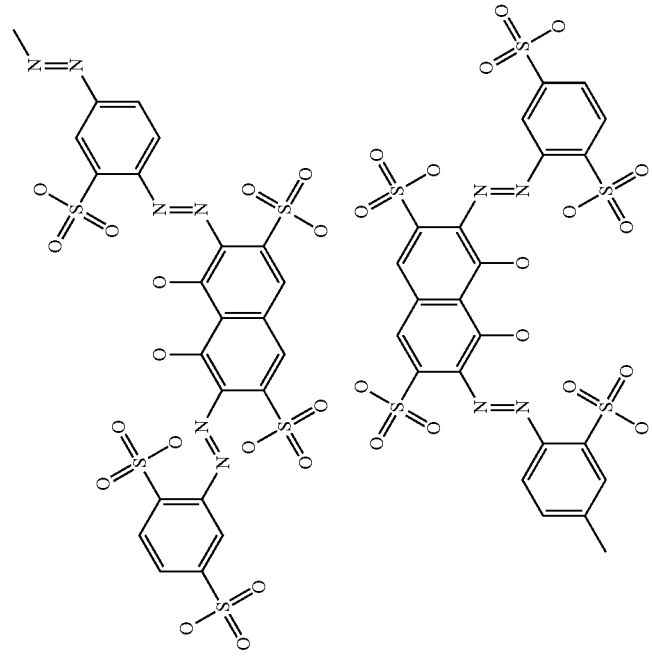 | — |

TABLE 3-continued

| Ex. | A | B | C | D (Formula of final dye) | Lambda Max (nm) |
|---|---|---|---|---|---|
| 54(*h) | N/A | 2,5-diethoxyaniline | 5-amino-2-nitrobenzoic acid | trisazo dye structure | — |
| 55(*h) | N/A | 2,5-dimethoxyaniline | 5-amino-2-nitrobenzoic acid | trisazo dye structure | — |

TABLE 3-continued

| Ex. | A | B | C | D (Formula of final dye) | Lambda Max (nm) |
|---|---|---|---|---|---|
| 56(*h) | N/A | N/A | [5-amino-2-nitrobenzoic acid] | [complex azo dye structure] | 642 |
| 57 | [2-amino-5-acetamidobenzoic acid] | [2,5-diethoxyaniline] | [5-amino-2-nitrobenzoic acid] | [complex azo dye structure] | 573 |
| 58 | [2-amino-5-acetamidobenzoic acid] | [2,5-dimethoxyaniline] | [5-amino-2-nitrobenzoic acid] | [complex azo dye structure] | 626 |

TABLE 3-continued
| Ex. | A | B | C | D (Formula of final dye) | Lambda Max (nm) |
|---|---|---|---|---|---|
| 59 | 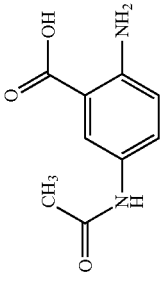 | N/A | 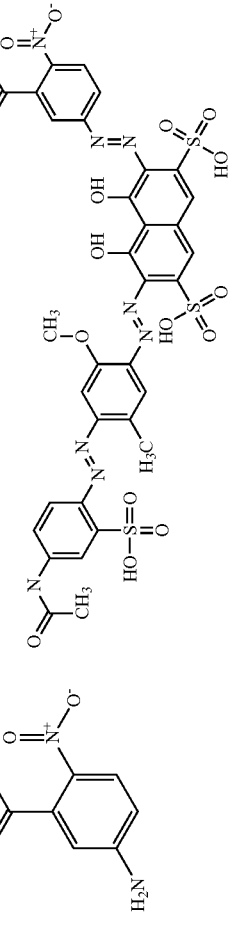 | 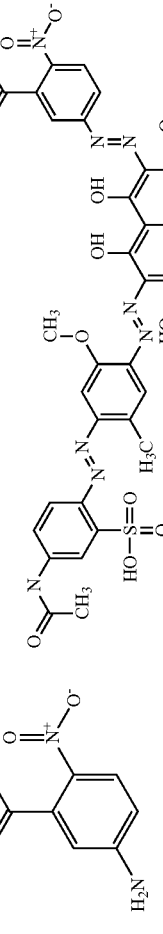 | 638 |
| 60 | N/A | 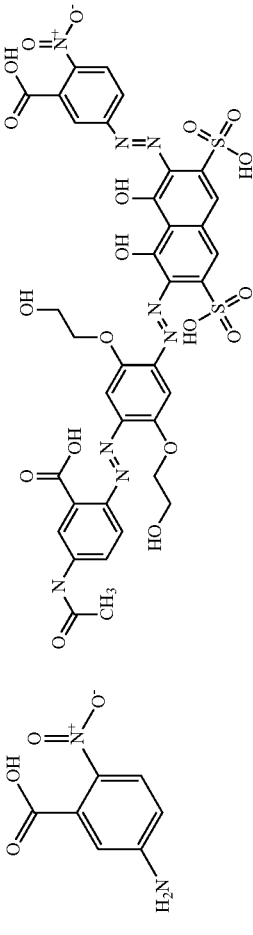 | 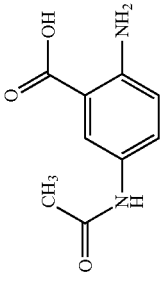 | 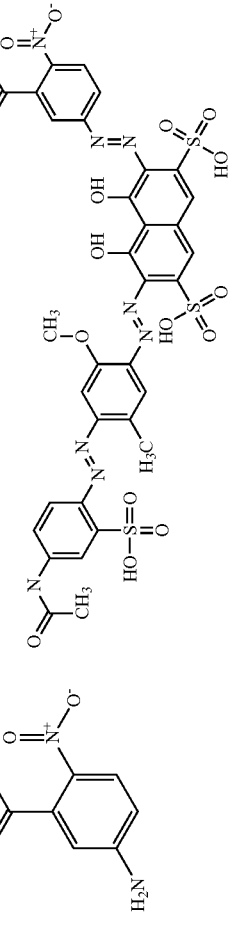 | 596 |

TABLE 3-continued

| Ex. | A | B | C | D (Formula of final dye) | Lambda Max (nm) |
|---|---|---|---|---|---|
| 61(*3) | N/A | N/A | 2-aminobenzene-1,4-disulfonic acid | (structure of final dye) | 659 |

TABLE 3-continued

| Ex. | A | B | C | D (Formula of final dye) | Lambda Max (nm) |
|---|---|---|---|---|---|
| 62(*3) | N/A | N/A | (structure: 5-amino-2-nitrobenzoic acid) | (structure of final dye) | 672 |

*acetyl groups removed by alkaline hydrolysis
(#)nitro reduced to amine by sodium sulphite
(*a)glucose reductive coupling of dis-azo intermediate as described above
(*b)amino-product derived from alkaline hydrolysis of the corresponding acetylamino-compound
(*1)from reductive coupling of two molecules of Example 9 via the terminal nitro groups
(*2)metallisation carried out after stage (A) by addition of 1 mole equivalent of metal (II) acetate
(*3)followed by:
removal of acetyl by hydrolysis
diazotisation TABLE 3-continued
| Ex. | A | B | C | D (Formula of final dye) | Lambda Max (nm) |
|---|---|---|---|---|---|
| coupling onto | 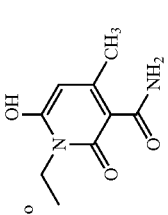 | | | | |

EXAMPLE 63—Ink Formulations

Inks may be prepared according to the following formulation wherein Dye is the dye from each of the Examples 1 to 15 above:

| | |
|---|---|
| 2-Pyrrolidone | 5 parts |
| Thiodiglycol | 5 parts |
| Surfynol ™ 465 | 1 part (from Air Products Inc., USA) |
| Dye | 3 parts |
| Water | 86 parts |

Further inks described in Tables 4 and 5 may be prepared wherein the Dye described in the first column is the Dye made in the above example of the same number. Numbers quoted in the second column onwards refer to the number of parts of the relevant ingredient and all parts are by weight. The inks may be applied to paper by thermal or piezo ink jet printing.

The following abbreviations are used in Table 3 and 4:

PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE 4

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 1 | 2.6 | 84 | | | 11 | | | | | | 5 | |
| 2 | 3.3 | 80 | 2 | | | 10 | | | | 2 | | 6 |
| 3 | 12.0 | 90 | | | | 7 | 0.3 | | 3 | | | |
| 4 | 5.4 | 69 | 2 | 20 | 2 | 1 | | | | | 3 | 3 |
| 5 | 6.0 | 91 | | | 4 | | | | | | 5 | |

TABLE 5

| Dye | Dye Content | Water | PG | DEG | NMP | CET | TBT | TDG | DBL | PHO | 2P | PI2 |
|---|---|---|---|---|---|---|---|---|---|---|---|---|
| 6 | 3.0 | 80 | 15 | | | 0.2 | | | | | 5 | |
| 7 | 9.0 | 90 | | 5 | | | | | | 1.2 | | 5 |
| 8 | 1.5 | 85 | 5 | 5 | | 0.15 | 5.0 | 0.2 | | | | |
| 9 | 2.5 | 90 | | 6 | 4 | | | | | 0.12 | | |
| 10 | 3.1 | 82 | 4 | 8 | | 0.3 | | | | | | 6 |
| 11 | 0.9 | 85 | | 10 | | | | | 5 | 0.2 | | |
| 12 | 8.0 | 90 | | 5 | 5 | | | 0.3 | | | | |
| 13 | 4.0 | 70 | | 10 | 4 | | | | 1 | | 4 | 11 |
| 14 | 2.2 | 75 | 4 | 10 | 3 | | | | 2 | | 6 | |
| 15 | 10.0 | 91 | | | 6 | | | | | | 3 | |
| 1 | 9.0 | 76 | | 9 | 7 | | 3.0 | | | 0.95 | 5 | |
| 2 | 5.0 | 78 | 5 | 11 | | | | | | | 6 | |
| 3 | 5.4 | 86 | | | 7 | | | | | | 7 | |
| 4 | 2.1 | 70 | 5 | 5 | 5 | 0.1 | 0.2 | 0.1 | 5 | 0.1 | 5 | |
| 5 | 2.0 | 90 | | | 10 | | | | | | | |
| 6 | 2 | 88 | | | | | | 10 | | | | |
| 7 | 5 | 78 | | | 5 | | | 12 | | | 5 | |
| 8 | 8 | 70 | 2 | | 8 | | | 15 | | | 5 | |
| 9 | 10 | 80 | | | | | | 8 | | | 12 | |
| 10 | 10 | 80 | | | 10 | | | | | | | |

EXAMPLE 64—Buffered Ink Formulations

Inks may be prepared according to the following formulation wherein Dye is the dye from each of the Examples:

| | |
|---|---|
| 2-Pyrrolidone | 5 parts |
| Propylene glycol | 5 parts |
| Surfynol™ 465 | 1 part (from Air Products Inc., USA) |
| Dye | 3 parts |
| TRIS | 2 parts |
| Water | 84 parts |
| pH adjusted to 7.5 by addition of base or acid | |

Further inks described in Tables 6 and 7 may be prepared wherein the Dye described in the first column is the Dye made in the above examples of the same number. Numbers quoted in the second column onwards refer to the number of parts of the relevant ingredient and all parts are by weight. The inks may be applied to paper by thermal or piezo ink jet printing.

The following additional abbreviations are used in Table 6, all other abbreviations are as used in Tables 4 and 5:

BIS-TRIS PROPANE=1,3-bis[tris(hydroxymethyl)methylamino]propane
TES=N-tris(hydroxymethyl)methyl-2-aminoethanesulfonic acid
MES=2-(N-morpholino)ethanesulfonic acid
HEPES=N-(2-hydroxyethyl)piperazine-N'-(2-ethanesulfonic acid)
MOBS=4-(N-morpholino)butanesulfonic acid
DIPSO=3-[N,N-bis(2-hydroxyethyl)amino]-2-hydroxypropanesulfonic acid
TRIS=tris(hydroxymethyl)aminomethane
ADA=N-(2-acetamido)-2-iminodiacetic acid
TRICINE=N-tris(hydroxymethyl)methylglycine
HEPPSO=N-(2-hydroxyethyl)piperazine-N'-(2-hydroxypropanesulfonic acid
DEAS=N,N-diethylanthranilic acid
PHO=NaH$_2$PO$_4$

EXAMPLES 65–74

Print Test Examples

The inks described in Example 63 were ink-jet printed onto a variety at papers using a Hewlett Packard DeskJet 560C™. The CIE colour co-ordinates of each print (a, b, L, Chroma and hue H) were measured using a Gretag Spectrolino Spectrodensitometer™ with 0°/45° measuring geometry with a spectral range of 400–700 nm at 20 nm spectral intervals, using illuminant D50 with a 2° (CIE 1931) observer angle and a density operation of status A. No less than 2 measurements were taken diagonally across a solid colour block on the print with a size greater than 10 mm×10 mm. The properties of the resultant prints are shown in Table 8, where the example number of the dye used to prepare the ink is indicated in the left hand column.

The substrates used in Tables 8, 9 and 10 were as follows:

| | Number |
|---|---|
| HP Printing Paper™ | 1 |
| HP Premium Plus MkII™ | 2 |
| Epson Premium Photo™ | 3 |
| Ilford Instant Dry™ | 4 |

TABLE 6

| Dye | Dye Content | Water | PG | DEG | NMP | DMK | Na Stearate | IPA | MEOH | 2P | MIBK | Buffer | Buffer substance | adjusted pH |
|---|---|---|---|---|---|---|---|---|---|---|---|---|---|---|
| 2 | 2.0 | 78 | 5 | | 6 | 4 | | | | 5 | | 2 | PHO | 7.8 |
| 2 | 3.0 | 86.2 | | 5 | 5 | | | | | | | 0.8 | TRIS | 7.2 |
| 2 | 10.0 | 75.5 | | 2 | 3 | 3 | | 5 | | | 1 | 0.5 | BIS-TRIS PROPANE | 6.4 |
| 5 | 2.1 | 88.7 | | 8 | | | | | | | 1 | 0.2 | TES | 7.1 |
| 5 | 3.1 | 77.7 | 5 | | | 0.2 | | 4 | | | 5 | 5 | HEPES | 7.5 |
| 5 | 8.5 | 70.5 | | | 9 | | | | | 9 | | 3 | MOBS | 8.0 |
| 7 | 2.5 | 45.5 | 4 | 15 | 3 | 3 | | 6 | 10 | 5 | 4 | 2 | DIPSO | 7.6 |
| 7 | 6 | 72 | | | | 10 | | 10 | | | | 2 | ADA | 6.5 |
| 7 | 12 | 622 | 5 | 4 | | 5 | 0.3 | | 6 | | 5 | 0.5 | TRICINE | 8.0 |

TABLE 7

| Dye | Dye Content | Water | PS | DEG | NMP | CET | TBT | TDG | BDL | 2P | PI2 | Buffer | Buffer substance | adjusted pH |
|---|---|---|---|---|---|---|---|---|---|---|---|---|---|---|
| 2 | 3.0 | 76.5 | 15 | | | 0.2 | | | 1 | 4 | | 0.3 | TRICINE | 7.9 |
| 2 | 9.0 | 80 | | 5 | | | | | | | 5 | 1 | HEPPSO | 7.7 |
| 2 | 1.5 | 81.4 | 5 | 5 | | 0.1 | 5.0 | 0.2 | | | | 1.8 | MES | 5.9 |
| 5 | 0.9 | 88.8 | | 6 | 4 | | | | | | | 0.3 | BIS-TRIS PROPANE | 6.8 |
| 5 | 3.1 | 88 | 4 | 8 | | 0.3 | | | | | 6 | 0.6 | TRIS | 7.8 |
| 5 | 9.5 | 74 | | 10 | | | | | 5 | | | 1.5 | DIPSO | 7.5 |
| 7 | 8.0 | 80.6 | | 5 | 5 | 0.1 | | 0.3 | | | | 0.8 | DEAS | 7.4 |
| 7 | 4.0 | 65 | | 10 | 4 | | | | | 5 | 11 | 1 | TRIG | 8.0 |
| 7 | 2.2 | 68.8 | 4 | 10 | 3 | | 1.0 | | 2 | 6 | | 3 | ADA | 6.5 |

TABLE 8

| Example No. | Dye | SUBSTRATE | DEPT H% | ROD | L | A | B | C | H |
|---|---|---|---|---|---|---|---|---|---|
| 65 | 2 | 1 | 100 | 1.15 | 33 | -2 | -8 | 8 | 254 |
| 65 | 2 | 1 | 70 | 0.48 | 65 | 1 | -9 | 9 | 274 |
| 65 | 2 | 2 | 10 | 0.93 | 11 | 0 | -10 | 10 | 270 |
| 65 | 2 | 2 | 70 | 0.75 | 50 | -1 | -8 | 8 | 260 |
| 65 | 2 | 3 | 100 | 1.93 | 11 | -1 | -12 | 12 | 266 |
| 65 | 2 | 3 | 70 | 0.74 | 50 | -2 | -7 | 7 | 254 |
| 65 | 2 | 4 | 100 | 2.02 | 10 | 0 | -13 | 13 | 270 |
| 65 | 2 | 4 | 70 | 0.00 | 40 | -2 | -11 | 11 | 259 |
| 66 | 3 | 1 | 100 | 1.04 | 37 | -1 | -12 | 12 | 266 |
| 66 | 3 | 1 | 70 | 0.44 | 67 | 1 | -12 | 12 | 276 |
| 66 | 3 | 2 | 100 | 1.63 | 19 | 0 | -17 | 17 | 270 |
| 66 | 3 | 2 | 70 | 0.66 | 55 | -2 | -11 | 11 | 262 |
| 66 | 3 | 3 | 100 | 1.73 | 17 | -1 | -22 | 22 | 268 |
| 66 | 3 | 3 | 70 | 0.66 | 55 | -3 | -13 | 13 | 258 |
| 66 | 3 | 4 | 100 | 1.72 | 17 | -1 | -20 | 20 | 267 |
| 66 | 3 | 4 | 70 | 0.72 | 52 | -2 | -14 | 14 | 261 |
| 67 | 8 | 1 | 100 | 1.20 | 31 | 0 | -8 | 8 | 270 |
| 67 | 8 | 1 | 70 | 0.49 | 64 | 1 | -10 | 10 | 278 |
| 67 | 8 | 2 | 100 | 1.61 | 18 | 1 | -2 | 2 | 301 |
| 67 | 8 | 2 | 70 | 0.78 | 49 | -4 | -7 | 8 | 241 |
| 67 | 8 | 3 | 100 | 1.56 | 19 | 1 | -5 | 5 | 287 |
| 67 | 8 | 3 | 70 | 0.74 | 51 | -4 | -9 | 10 | 244 |
| 67 | 8 | 4 | 100 | 1.57 | 19 | 2 | -4 | 4 | 294 |
| 67 | 8 | 4 | 70 | 0.86 | 45 | -4 | -10 | 11 | 249 |
| 68 | 25 | 1 | 100 | 1.11 | 34 | -3 | -8 | 9 | 249 |
| 68 | 25 | 1 | 70 | 0.48 | 65 | 0 | -9 | 9 | 271 |
| 68 | 25 | 2 | 100 | 2.29 | 6 | -2 | -11 | 11 | 259 |
| 68 | 25 | 2 | 70 | 0.83 | 46 | -4 | -9 | 10 | 245 |
| 68 | 25 | 3 | 100 | 2.23 | 7 | -2 | -15 | 15 | 263 |
| 68 | 25 | 3 | 70 | 0.85 | 46 | -5 | -12 | 13 | 248 |
| 68 | 25 | 4 | 100 | 2.07 | 9 | -3 | -12 | 12 | 254 |
| 68 | 26 | 4 | 70 | 0.91 | 43 | -6 | -11 | 13 | 243 |
| 69 | 29 | 1 | 100 | 1.02 | 38 | -3 | -4 | 5 | 237 |
| 69 | 29 | 1 | 70 | 0.47 | 65 | 1 | -8 | 8 | 274 |
| 69 | 29 | 2 | 100 | 1.84 | 13 | 0 | -8 | 8 | 265 |
| 69 | 29 | 2 | 70 | 0.74 | 50 | -1 | -6 | 6 | 259 |
| 69 | 29 | 3 | 100 | 1.65 | 17 | -1 | -8 | 5 | 266 |
| 69 | 29 | 3 | 70 | 0.68 | 53 | -1 | -5 | 6 | 261 |
| 69 | 29 | 4 | 100 | 1.74 | 16 | -3 | -10 | 11 | 253 |
| 69 | 29 | 4 | 70 | 0.80 | 48 | -3 | -8 | 9 | 261 |
| 70 | 34 | 1 | 100 | 1.08 | 35 | -2 | -5 | 6 | 253 |
| 70 | 34 | 1 | 70 | 0.47 | 66 | 1 | -8 | 8 | 278 |
| 70 | 34 | 2 | 100 | 1.80 | 14 | -5 | -5 | 7 | 226 |
| 70 | 34 | 2 | 70 | 0.78 | 49 | -4 | -5 | 6 | 229 |
| 70 | 34 | 3 | 100 | 1.82 | 14 | -3 | -8 | 9 | 248 |
| 70 | 34 | 3 | 70 | 0.74 | 50 | -3 | -6 | 6 | 239 |
| 70 | 34 | 4 | 100 | 1.74 | 15 | -2 | -9 | 9 | 257 |
| 70 | 34 | 4 | 70 | 0.82 | 47 | -3 | -7 | 7 | 248 |
| 71 | 37 | 1 | 100 | 0.98 | 39 | -3 | -7 | 7 | 248 |
| 71 | 37 | 1 | 70 | 0.46 | 66 | 0 | -9 | 9 | 272 |
| 71 | 37 | 2 | 100 | 1.48 | 22 | 0 | -11 | 11 | 270 |
| 71 | 37 | 2 | 70 | 0.64 | 56 | 0 | -7 | 7 | 266 |
| 71 | 37 | 3 | 100 | 1.34 | 26 | 1 | -12 | 12 | 273 |
| 71 | 37 | 3 | 70 | 0.59 | 58 | 0 | -8 | 8 | 270 |
| 71 | 37 | 4 | 100 | 1.41 | 24 | -1 | -12 | 13 | 267 |
| 71 | 37 | 4 | 70 | 0.67 | 54 | 0 | -9 | 9 | 268 |
| 72 | 49 | 1 | 100 | 0.97 | 39 | 3 | -3 | 5 | 317 |
| 72 | 49 | 1 | 70 | 0.44 | 67 | 4 | -7 | 8 | 298 |
| 72 | 49 | 2 | 100 | 1.54 | 19 | 8 | -4 | 9 | 337 |
| 72 | 49 | 2 | 70 | 0.64 | 55 | 4 | -3 | 5 | 321 |
| 72 | 49 | 3 | 100 | 1.38 | 23 | 10 | -4 | 10 | 335 |
| 72 | 49 | 3 | 70 | 0.59 | 57 | 6 | -3 | 7 | 329 |
| 72 | 49 | 4 | 100 | 1.43 | 22 | 9 | -4 | 10 | 336 |
| 72 | 49 | 4 | 70 | 0.67 | 53 | 6 | -3 | 7 | 333 |
| 73 | 53 | 1 | 100 | 1.06 | 37 | -8 | -13 | 15 | 240 |
| 73 | 53 | 1 | 70 | 0.44 | 68 | -2 | -12 | 12 | 261 |
| 73 | 53 | 2 | 100 | 1.83 | 15 | -11 | -18 | 21 | 237 |
| 73 | 53 | 2 | 70 | 0.71 | 53 | -8 | -12 | 14 | 237 |
| 73 | 53 | 3 | 100 | 1.75 | 18 | -10 | -23 | 25 | 247 |
| 73 | 53 | 3 | 70 | 0.73 | 53 | -9 | -16 | 19 | 242 |
| 73 | 53 | 4 | 100 | 1.77 | 17 | -11 | -20 | 23 | 242 |
| 73 | 53 | 4 | 70 | 0.80 | 49 | -10 | -17 | 19 | 239 |
| 74 | 59 | 1 | 100 | 0.78 | 48 | -1 | -4 | 4 | 256 |
| 74 | 59 | 1 | 70 | 0.42 | 68 | 1 | -7 | 7 | 277 |
| 74 | 59 | 2 | 100 | 1.43 | 24 | -8 | -3 | 9 | 203 |
| 74 | 59 | 2 | 70 | 0.72 | 52 | -7 | -4 | 8 | 209 |

TABLE 8-continued

| Example No. | Dye | SUBSTRATE | DEPT H% | ROD | L | A | B | C | H |
|---|---|---|---|---|---|---|---|---|---|
| 74 | 59 | 3 | 100 | 1.52 | 22 | −11 | −5 | 12 | 204 |
| 74 | 59 | 3 | 70 | 0.69 | 53 | −9 | −4 | 10 | 204 |
| 74 | 59 | 4 | 100 | 1.61 | 19 | −11 | −5 | 12 | 204 |
| 74 | 59 | 4 | 70 | 0.77 | 50 | −9 | −5 | 10 | 211 |

Light Fastness

To evaluate light fastness the prints were irradiated in an Atlas Ci5000 Weatherometer™ for 100 hours. The results are shown in Table 9 where the example number of the dye used to prepare the ink is indicated in the left hand column. The degree of fade is expressed as $\Delta E$ where a lower figure indicates higher light fastness, and $\Delta E$ is defined as the overall change in the CIE colour co-ordinates L, a, b of the print and is expressed by the equation $\Delta E = (\Delta L^2 + \Delta a^3 + \Delta b^2)^{0.5}$.

TABLE 9

| Example No. | Dye | SUBSTRATE | $\Delta E$ |
|---|---|---|---|
| 65 | 2 | 1 | 17 |
| 65 | 2 | 2 | 62 |
| 64 | 2 | 3 | 14 |
| 64 | 2 | 4 | 47 |
| 66 | 3 | 1 | 16 |
| 66 | 3 | 2 | 20 |
| 66 | 3 | 3 | 23 |
| 66 | 3 | 4 | 36 |
| 67 | 8 | 1 | 16 |
| 67 | 8 | 2 | 16 |
| 67 | 8 | 3 | 7 |
| 67 | 8 | 4 | 24 |
| 68 | 25 | 1 | 14 |
| 68 | 25 | 2 | 30 |
| 68 | 25 | 3 | 33 |
| 68 | 25 | 4 | 55 |
| 69 | 29 | 1 | 13 |
| 69 | 29 | 2 | 18 |
| 69 | 29 | 3 | 15 |
| 69 | 29 | 4 | 34 |
| 70 | 34 | 1 | 8 |
| 70 | 34 | 2 | 11 |
| 70 | 34 | 3 | 9 |
| 70 | 34 | 4 | 17 |
| 71 | 37 | 1 | 16 |
| 71 | 37 | 2 | 35 |
| 71 | 37 | 3 | 33 |
| 71 | 37 | 4 | 46 |
| 72 | 49 | 1 | 12 |
| 72 | 49 | 2 | 10 |
| 72 | 49 | 3 | 9 |
| 72 | 49 | 4 | 36 |
| 73 | 53 | 1 | 17 |
| 73 | 53 | 2 | 27 |
| 73 | 53 | 3 | 21 |
| 73 | 53 | 4 | 55 |
| 74 | 59 | 1 | 4 |
| 74 | 59 | 2 | 10 |
| 74 | 59 | 3 | 12 |
| 74 | 59 | 4 | 25 |

Ozone Fastness

The inks from Examples and were printed onto the substrate shown using a HP560™ ink jet printer. The printed substrate was then assessed for ozone stability using an ozone test cabinet from Hampden Test Equipment. The test was carried out for 24 hours at 40° C. and 50% relative humidity in the presence of 1 part per million of ozone. Fastness of the printed ink to ozone was judged by the difference in the optical density before and after exposure to ozone using a Gretag Spectrolino Spectrodensitometer. Thus, the lower the % OD loss the greater the ozone fastness. The results are shown in Table 10 where the example number of the dye used to prepare the ink is indicated in the left hand column. These clearly demonstrate that inks based on compositions of this invention display good ozone fastness.

TABLE 10

| Example No. | Dye | SUBSTRATE | % OD loss |
|---|---|---|---|
| 65 | 2 | 3 | 3 |
| 65 | 2 | 4 | 5 |
| 66 | 3 | 3 | 12 |
| 66 | 3 | 4 | 13 |
| 67 | 8 | 3 | 6 |
| 67 | 8 | 4 | 8 |
| 68 | 25 | 3 | 6 |
| 68 | 25 | 4 | 12 |
| 69 | 29 | 3 | 12 |
| 69 | 29 | 4 | 21 |
| 70 | 34 | 3 | 39 |
| 70 | 34 | 4 | 41 |
| 71 | 37 | 3 | 27 |
| 71 | 37 | 4 | 35 |
| 72 | 49 | 3 | 30 |
| 72 | 49 | 4 | 32 |
| 73 | 53 | 3 | 3 |
| 73 | 53 | 4 | 5 |
| 74 | 59 | 3 | 5 |
| 74 | 59 | 4 | 7 |

The invention claimed is:

1. A process for printing an image on a substrate comprising applying thereto a composition comprising a liquid medium and a compound of Formula (1):

T-Q-N=N-L-T      Formula (1)

wherein:
each T independently is an azo group of the formula A-N=N— wherein each A independently is an optionally substiuted aryl, heteroaryl, non-aromatic heterocyclic or an alkenyl group;
Q is an optionally substituted, optionally metallised 1,8-dihydroxynaphthyl group of Formula (4);

Formula (4)

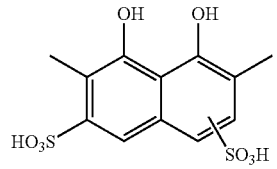

L is a divalent organic linker group; and wherein each A and L independently carries 1 or 2 substituents, and with the proviso that at least one of the groups represented by T comprises a water-solubilising group.

2. A composition comprising a liquid medium and a compound of Formula (1):

  Formula (1)

wherein:
each T independently is an azo group of the formula A-N═N— wherein each A independently is an optionally substiuted aryl, heteroaryl, non-aromatic heterocyclic or an alkenyl group;
Q is an optionally substituted, optionally metallised 1,8-dihydroxynaphthyl group of Formula (4);

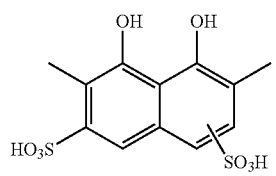 Formula (4)

L is a divalent organic linker group; and wherein each A and L independently carries 1 or 2 substituents, and with the proviso that at least one of the groups represented by T comprises a water-solubilising group.

3. A composition according to claim 2 which further comprises a pH buffer and the composition has a H of 4 to 8.

4. A composition according to claim 3 wherein the buffer is selected from the group consisting of (tris(hydroxymethyl)aminomethane), cationic aliphatic primary amines, zwitterionic amino acids, phosphate buffers, amino-hydroxyalkylsulfonic acid zwitterions and trishydroxymethylaminomethane derivatives.

5. A composition according to claim 2 wherein the liquid medium further comprises an oxidant.

6. A process for the preparation of a compound of Formula (1):

 Formula (1)

wherein:
each T independently is an azo group of the formula A-N═N— wherein each A independently is an optionally substiuted aryl, heteroaryl, non-aromatic heterocyclic or an alkenyl group;
Q is an optionally substituted, optionally metallised 1,8-dihydroxynaphthyl group of Formula (4);

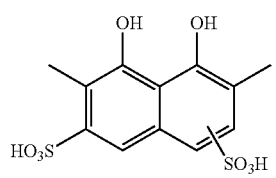 Formula (4)

L is a divalent organic linker group; and wherein each A and L independently carries 1 or 2 substituents;
which process comprises diazotising an amine and coupling the resultant diazonium salt with a compound of formula T-Q-N═N-LH, wherein T, L and Q are each independently as defined in Formula (1), and with the proviso that at least one of the groups represented by T comprises a water-solubilising group.

7. A process for the preparation of Formula (1):

 Formula (1)

wherein:
each T independently is an azo group of the formula A-N═N— wherein each A independently is an optionally substiuted aryl, heteroaryl, non-aromatic heterocyclic or an alkenyl group;
Q is an optionally substituted, optionally metallised 1,8-dihydroxynaphthyl group of Formula (4);

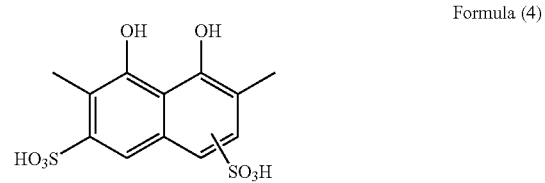 Formula (4)

L is a divalent organic linker group; and wherein each A and L independently carries 1 or 2 substituents;
which comprises the reaction of a compound of formula T-X—N═N-L-T with a strong base thereby forming a compound of Formula (1), wherein each T independently and L are as defined in Formula (1) and X is an optionally substituted 1-hydroxy-8-amino-naphthylene group, and with the proviso that at least one of the groups represented by T comprises a water-solubilising group.

8. A compound of Formula (1):

 Formula (1)

wherein:
each T independently is an azo group of the formula A-N═N— wherein each A independently is an optionally substiuted aryl, heteroaryl, non-aromatic heterocyclic or an alkenyl group;
Q is an optionally substituted, optionally metallised 1,8-dihydroxynaphthyl group of Formula (4);

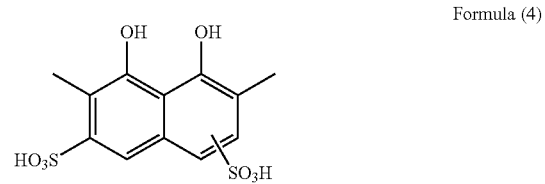 Formula (4)

L is a divalent organic linker group; and wherein each A and L independently carries 1 or 2 substituents; and with the proviso that at least one of the groups represented by T comprises a water-solubilising group.

9. A compound according to claim 8 wherein at least one group represented by A carries at least one sulpho group.

10. A compound according to claim 8 wherein at both groups represented by A carry at least one sulpho group.

11. A compound according to any one of claim 8 or 9 wherein L is of Formula (7):

 Formula (7)

wherein:
$L^1$ is a single covalent bond or optionally substituted phenyl or naphthyl;

L² is optionally substituted phenyl or naphthyl;
G is —O—, —NR²—, —N=N—, —NR²—CO—, —NR²CONR²—, —S—, —SO—, —SO₂—, —SO₂NR²— or —CR²=CR²—, wherein each R² independently is H or $C_{1-4}$-alkyl; and
X is 0, 1 or 2.

12. A compound according to claim 8 wherein:
each A independently is optionally substituted phenyl, naphthyl, pyridyl or pyrazolyl;
Q is of Formula (5) or (6) or a metal complex thereof:

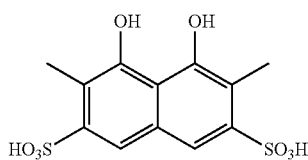

Formula (5)

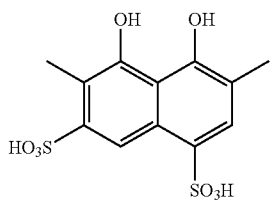

Formula (6)

L is of Formula (7):

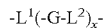

Formula (7)

wherein;
L¹ is a single covalent bond or optionally substituted phenyl or naphthyl;
L² is optionally substituted phenyl or naphthyl;
G is —O—, —NR²—, —N=N—, —NR²—CO—, —NR²CONR²—, —S—, —SO—, —SO₂—, —SO₂NR₂— or —CR²=CR²—, wherein each R² independently is H or $C_{1-4}$-alkyl; and
X is 0, 1 or 2.

13. A compound according to claim 8 or 12 wherein said optional substituents which may be present on A and L are selected from the group consisting of OH, SO₃H, PO₃H₂, CO₂H, NO₂, NH₂, optionally substituted alkyl, optionally substituted alkoxy, optionally substituted amine, optionally substituted acylamine and optionally substituted azo.

14. A compound according to claim 8 or 12 wherein said optional substituents which may be present on A and L are selected from the group consisting of OH; SO₃H; PO₃H₂; CO₂H; NO₂; NH₂; $C_{1-4}$-alkyl optionally carrying a sulpho, carboxy, phosphato, $C_{1-4}$-alkoxy, amino or hydroxy group; $C_{1-4}$-alkoxy optionally carrying a sulpho, carboxy, phosphato, $C_{1-4}$-alkoxy, $C_{1-4}$alkyl, amino or hydroxy group; N carrying one or two $C_{1-4}$-alkyl groups optionally carrying a sulpho, carboxy, phosphato, $C_{1-4}$-alkoxy, amino or hydroxy group; $C_{1-4}$-acylamino; and phenylazo, naphthylazo and heteroarylazo where the phenyl, naphthyl and heteroaryl units are optionally further substituted with one or more groups selected from the group consisting of OH, SO₃H, PO₃H₂, CO₂H, NO₂ and NH₂, and azo groups containing a substituent of Formula (2):

Formula (2)

wherein
Y is an electron withdrawing group;
Y¹ is H, alkyl or aryl, OR or N(R)₂ in which each R independently is H, optionally substituted alkyl or optionally substituted aryl; or,
Y and Y¹ together with the double bond shown above form a 5- or 6-membered ring; and
X¹ comprises at least one heteroatom selected from the group consisting of N, O and S.

15. A compound according to claim 8 of Formula (8) or a salt thereof:

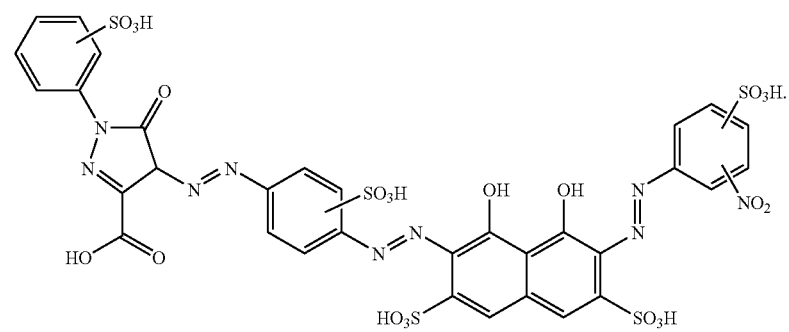

Formula (8)

16. A compound according to claim 8 of Formula (9) or a salt thereof:

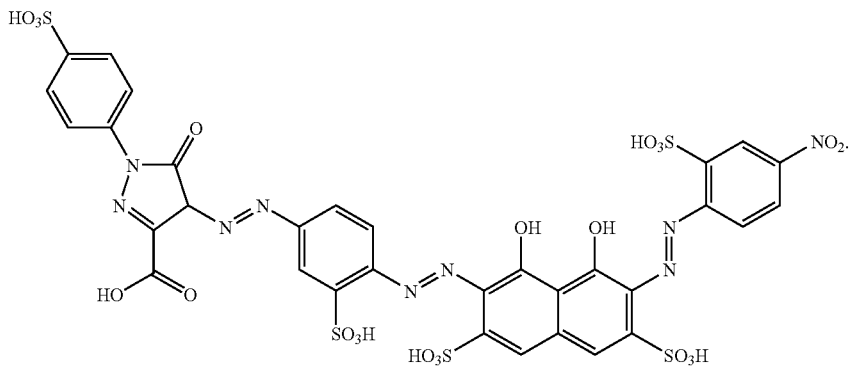

Formula (9)

17. A paper, an overhead projector slide or a textile material printed by means of a process according to claim 1.

18. A paper, an overhead projector slide or a textile material printed with a compound according to claim 8.

19. An ink jet printer cartridge, optionally refillable, comprising one or more chambers and a composition, wherein the composition is present in at least one of the chambers and the composition is as defined in claim 2.

20. An ink set comprising a black ink, a magenta ink, a cyan ink an a yellow ink, wherein the black ink comprises a compound according to claim 8 or 15.

21. An ink set comprising a black ink, a magenta ink, a cyan ink and a yellow ink, wherein the black ink comprises a composition according to claim 2.

22. A compound according to claim 12 wherein said substituents which may be present on A and $L^1$ and $L^2$ are selected from the group consisting of OH, $SO_3H$, $PO_3H_2$, $CO_2H$, $NO_2$, $NH_2$, optionally substituted alkyl, optionally substituted alkoxy, optionally substituted amine, optionally substituted acylamine and optionally substituted azo.

23. A compound according to claim 12 wherein said optional substituents which may be present on A and $L^1$ and $L^2$ are selected from the group consisting of OH; $SO_3H$; $PO_3H_2$; $CO_2H$; $NO_2$; $NH_2$; $C_{1-4}$-alkyl optionally carrying a sulpho, carboxy, phosphato, $C_{1-4}$-alkoxy, amino or hydroxy group; $C_{1-4}$-alkoxy optionally carrying a sulpho, carboxy, phosphato, $C_{1-4}$-alkoxy, $C_{1-4}$alkyl, amino or hydroxy group; N carrying one or two $C_{1-4}$-alkyl groups optionally carrying a sulpho, carboxy, phosphato, $C_{1-4}$-alkoxy, amino or hydroxy group; $C_{1-4}$-acylamino; and phenylazo, naphthylazo and heteroarylazo where the phenyl, naphthyl and heteroaryl units are optionally further substituted with one or more groups selected from OH, $SO_3H$, $PO_3H_2$, $CO_2H$, $NO_2$ and $NH_2$, and azo groups containing a substituent of Formula (2):

Formula (2)

wherein
Y is an electron withdrawing group;
$Y^1$ is H, alkyl or aryl, OR or $N(R)_2$ in which each R independently is H, optionally substituted alkyl or optionally substituted aryl; or,
Y and $Y^1$ together with the double bond shown above form a 5- or 6-membered ring; and
$X^1$ comprises at least one heteroatom selected from the group consisting of N, O and S.

24. A compound according to claim 8 wherein L carries at least one substituent of the formula —O—$(CH_2)_{1-4}$OH or carries at least one sulpho group.

* * * * *